(12) United States Patent
Wilson

(10) Patent No.: US 8,289,739 B2
(45) Date of Patent: Oct. 16, 2012

(54) POWER SUPPLY CONTINUOUS INPUT VOLTAGE EXTENDER

(75) Inventor: Glenn Wilson, Endicott, NY (US)

(73) Assignee: Emerson Electric Co., St. Louis, MO (US)

( * ) Notice: Subject to any disclaimer, the term of this patent is extended or adjusted under 35 U.S.C. 154(b) by 332 days.

(21) Appl. No.: 12/701,869

(22) Filed: Feb. 8, 2010

(65) Prior Publication Data

US 2011/0141781 A1    Jun. 16, 2011

Related U.S. Application Data

(63) Continuation-in-part of application No. 12/634,920, filed on Dec. 10, 2009.

(51) Int. Cl.
    *H02H 7/10* (2006.01)
(52) U.S. Cl. .......................................... 363/50
(58) Field of Classification Search .................. 363/16, 363/34, 37, 125–127, 131, 133, 50, 52, 55
    See application file for complete search history.

(56) References Cited

U.S. PATENT DOCUMENTS

| 5,748,422 | A | 5/1998 | Heaston et al. |
| 6,061,259 | A | 5/2000 | DeMichele |
| 6,559,777 | B1 * | 5/2003 | Martin et al. ............... 340/981 |
| 6,670,724 | B2 * | 12/2003 | Ely et al. ................... 307/10.1 |
| 7,183,721 | B2 * | 2/2007 | Haque ........................ 315/209 R |
| 7,259,609 | B2 | 8/2007 | Pentakota et al. |
| 8,093,955 | B2 * | 1/2012 | Ying et al. ................ 331/111 |
| 2006/0083038 | A1 | 4/2006 | Lynch |

FOREIGN PATENT DOCUMENTS

| GB | 2208019 | 2/1989 |
| GB | 2458699 | 9/2009 |
| WO | 2009134871 | 5/2009 |

OTHER PUBLICATIONS

Difalco, L., "SMPS Design Extends Universal Input to 690 Vac," Power Electronics Technology, Oct. 2007, pp. 20-25.
"Cycloconverter," Wikipedia, [retrieved from the Internet on Dec. 8, 2009 using <URL: http://en.wikipedia.org/wiki/Cycloconverter>].
Imbernon, L., International Search Report for International Patent Application No. PCT/US2010/059735, European Patent Office, dated Jan. 25, 2012.
Imbernon, L., Written Opinion for for International Patent Application No. PCT/US2010/059735, European Patent Office, dated Jan. 25, 2012.

* cited by examiner

*Primary Examiner* — Adolf Berhane
(74) *Attorney, Agent, or Firm* — Locke Lord LLP

(57) ABSTRACT

A system and method for providing acceptable output power from a wide range of received power, comprising: outputting a received voltage as an output voltage if the received voltage does not exceed a threshold; and limiting the output voltage to the threshold if the received voltage exceeds the threshold. Limiting the output voltage may comprise dropping an excess voltage across a switching element, wherein the excess voltage is the received voltage minus the threshold.

16 Claims, 28 Drawing Sheets

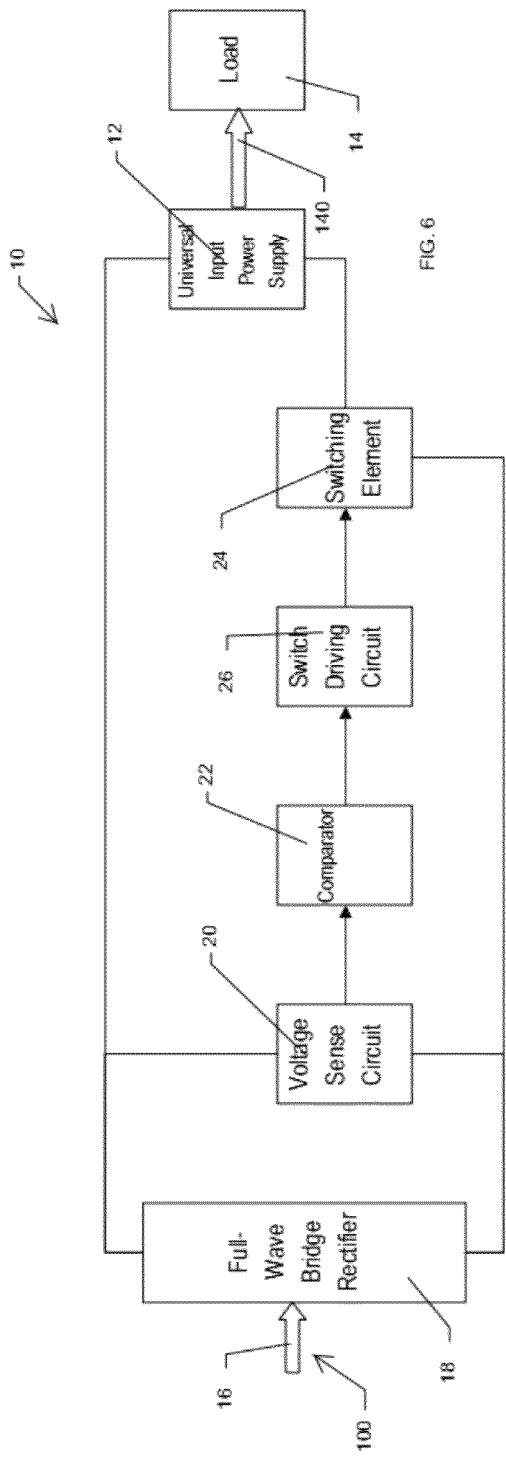
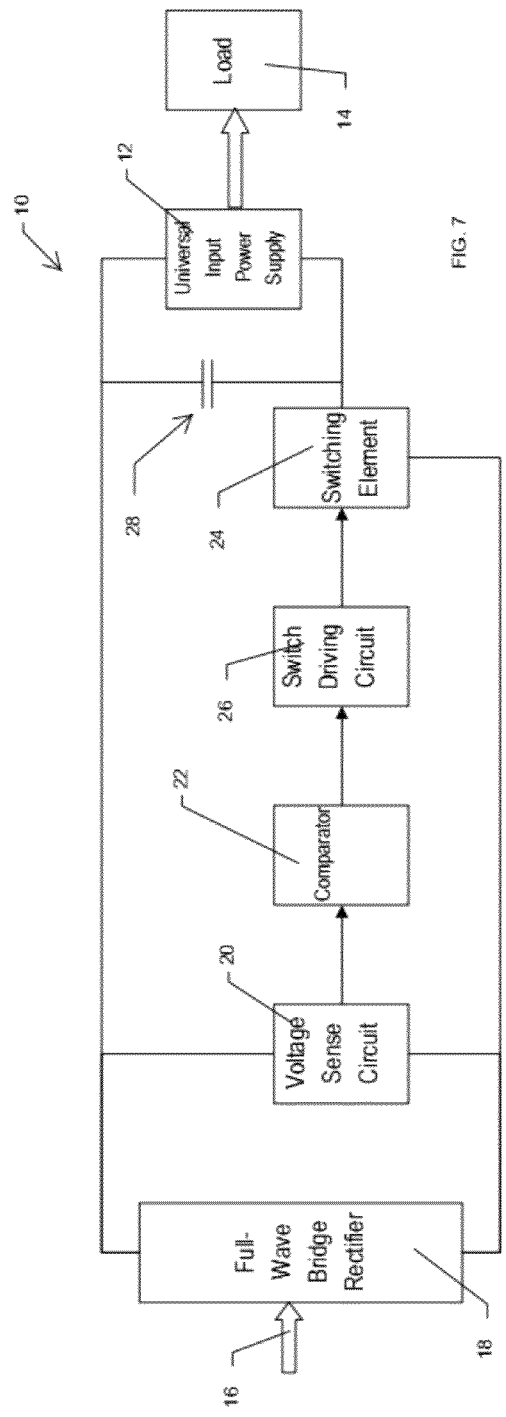

POWER SUPPLY CONTINUOUS INPUT VOLTAGE EXTENDER

CROSS REFERENCE TO RELATED APPLICATIONS

This application is a Continuation-In-Part of U.S. patent application Ser. No. 12/634,920 entitled "Power Supply Discontinuous Input Voltage Extender", filed Dec. 10, 2009, which is incorporated herein be specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to voltage converters; and more specifically relate to step-down voltage converters for power supplies.

2. Description of the Related Art

U.S. Pat. No. 5,748,422 discloses a "power latch circuit for a computer is improved by the expansion of an activate control circuit to include overvoltage protection circuitry. The activate control circuit is responsive to either an activate input circuit or a feedback latch circuit to activate an activating transistor which in turn activates a series transistor providing power from a DC electric power source through a voltage regulating circuit to the computer, which is programmed to turn itself off by activating a deactivate transistor to deactivate the activating and series transistors. In the improved circuit, the activate control circuit includes elements for activating the activating transistor and series transistor in a switching mode when the output voltage of the series transistor does not exceed a fixed limit voltage and in a voltage regulating mode when the output voltage of the series transistor exceeds the fixed limit voltage, whereby an increase in the output voltage of the series transistor beyond the fixed limit voltage is reduced. The activate control circuit further deactivates a hold-off transistor during activation of the activating and series transistors, regardless of the mode of operation."

U.S. Pat. No. 7,259,609 discloses a "clamping circuit containing a transistor and a current amplifier. The transistor is designed to turn on when the voltage at a node exceeds (falls below) a specified upper (lower) level. The current amplifier is designed to draw substantial amount of current when the transistor is turned on to clamp the voltage at the node to the desired level."

*SMPS Design Extends Universal Input to 690 Vac*, by Luca Difalco, which was published by Power Electronics Technology, on Oct. 1, 2007, discusses a "quasi-resonant flyback converter uses high-voltage emitter-switched bipolar transistors to achieve the wide input voltage range needed to power digital electric-energy meters in both residential and industrial applications."

Other examples of power converter systems include "A cycloconverter or a cycloinverter converts an AC waveform, such as the mains supply, to another AC waveform of a lower frequency, synthesizing the output waveform from segments of the AC supply without an intermediate direct-current link", according to a Wikipedia article entitled *Cycloconverter*, as available on Dec. 8, 2009.

The inventions disclosed and taught herein are directed to an improved method and system for stepping down relatively high voltage to a lower voltage.

BRIEF SUMMARY OF THE INVENTION

The invention includes a system and method for providing acceptable output power from a wide range of received power, the method comprising the steps of: receiving the received power; determining if the received power is within predefined limits; if the received power is within the limits, outputting the received power; and if the received power is outside the limits, converting the received power to conditioned power and outputting the conditioned power.

In some embodiments, the invention includes a method of providing acceptable output power from a wide range of received power, comprising: outputting a received voltage as an output voltage if the received voltage does not exceed a threshold; and limiting the output voltage to the threshold if the received voltage exceeds the threshold. The received voltage may be multi-phase power and the output voltage will remain acceptable during a phase loss in the received voltage. The received voltage may be rectified, such that the output voltage is a rectified version of the received voltage. Limiting the output voltage may comprise dropping excess voltage across a switching element. The switching element may be a transistor. The current of the output power preferably flows though the switching element. The threshold may be between about 330 volts and 360 volts and/or between 300 colts and 375 volts. The output voltage may be used to power a universal input power supply.

BRIEF DESCRIPTION OF THE SEVERAL VIEWS OF THE DRAWINGS

FIG. 6 illustrates a simplified circuit diagram of a first embodiment of a system utilizing certain aspects of the present inventions;

FIG. 7 illustrates a simplified circuit diagram of a second embodiment of a system utilizing certain aspects of the present inventions;

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a system and method for providing acceptable output power from a wide range of received power, the method comprising the steps of: receiving the received power; determining if the received power is within predefined limits; if the received power is within the limits, outputting the received power; and if the received power is outside the limits, converting the received power to conditioned power and outputting the conditioned power.

Figure 1:
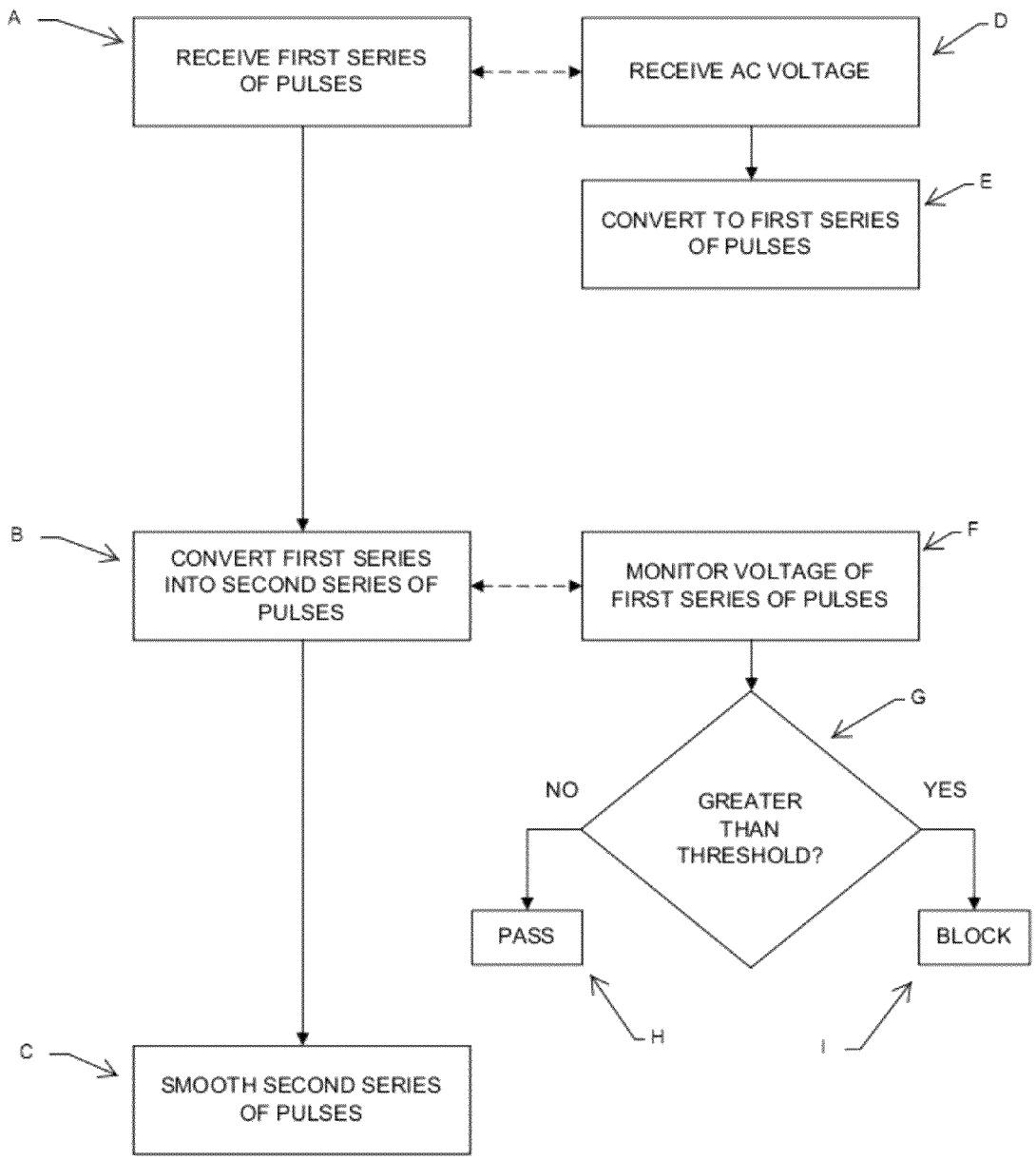
FIG. 1 illustrates a flow chart for a particular embodiment of a method for converting a relatively high voltage into a relatively low voltage utilizing certain aspects of the present inventions.

FIG. 1 is an illustration of a method of converting a relatively high voltage into a relatively low voltage. The method comprises receiving a first series of pulses at the relatively high voltage and a first frequency, as shown in step A; and converting the first series of pulses into a second series of pulses at a second voltage lower than the relatively high voltage and a second frequency higher than the first frequency, as shown in step B. The second series of pulses may be smoothed to provide a relatively steady direct current at the relatively low voltage, as shown in step C.

Figure 2:
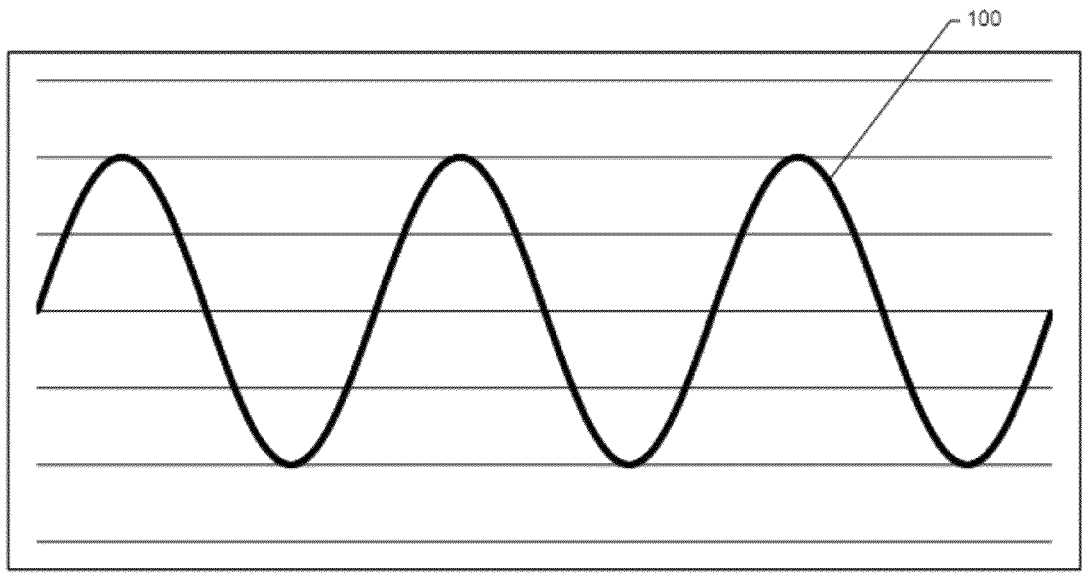
FIG. 2 illustrates an input voltage waveform.
Figure 3:
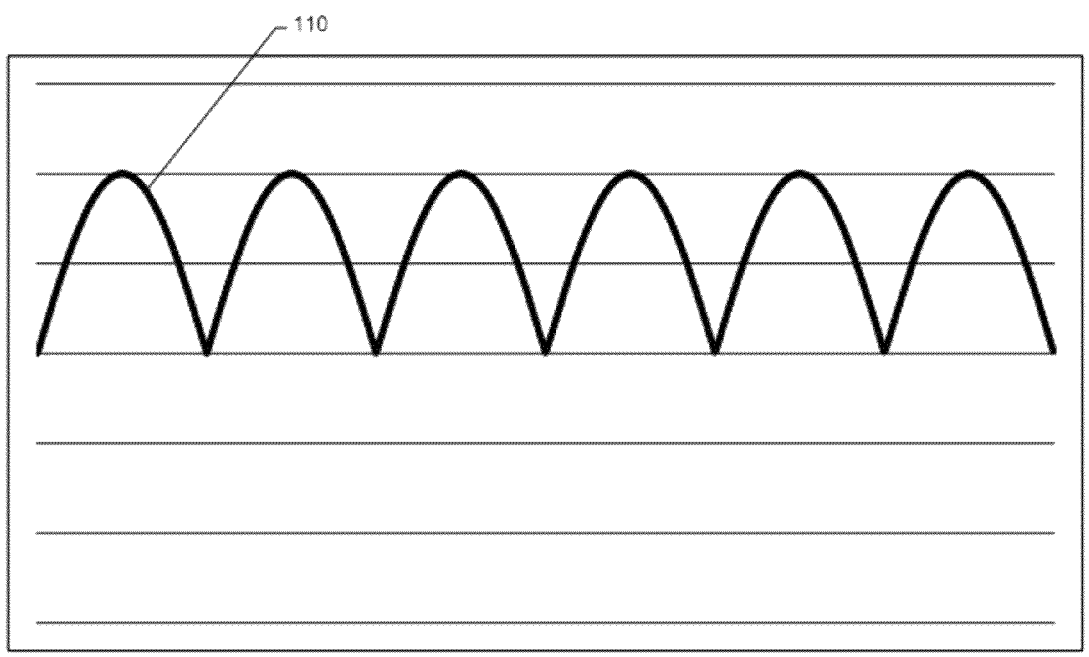
FIG. 3 illustrates a rectified input voltage waveform exhibiting a first series of pulses.

More specifically, step A may comprise receiving an alternating current voltage, or received/input power, 100, as shown in step D and FIG. 2, and rectifying the alternating current voltage into the first series of pulses 110, as shown in step E and FIG. 3. The rectification may by performed using a half-wave bridge rectifier or a full-wave bridge rectifier. In any case, the received alternating current voltage 100 may be at the relatively high voltage, such as 480 or 600 volts RMS, and a first frequency, such as 60 hertz. However, the present invention is particularly well suited to receiving voltages greater than 265 volts RMS, greater than 480 volts RMS, greater than 600 volts RMS, and/or greater than 700 volts RMS.

The first series of pulses may be a waveform comprising pulses of voltage and/or current. In one embodiment, step B may comprise monitoring the voltage of the waveform of the first series of pulses 110, as shown in step F. The voltage of the waveform of the first series of pulses 110 may be compared to a threshold 120, as shown in step G and FIG. 4. If the voltage of the waveform of the first series of pulses 110 is less than, equal to, or does not exceed the threshold 120, the waveform may be passed directly without change, as shown in step H. If the voltage of the waveform of the first series of pulses 110 is greater than, equal to, or exceeds the threshold 120, the waveform may be blocked, as shown in step I. This action of selectively passing or blocking the first series of pulses 110 creates the second series of pulses 130.

Figure 4:
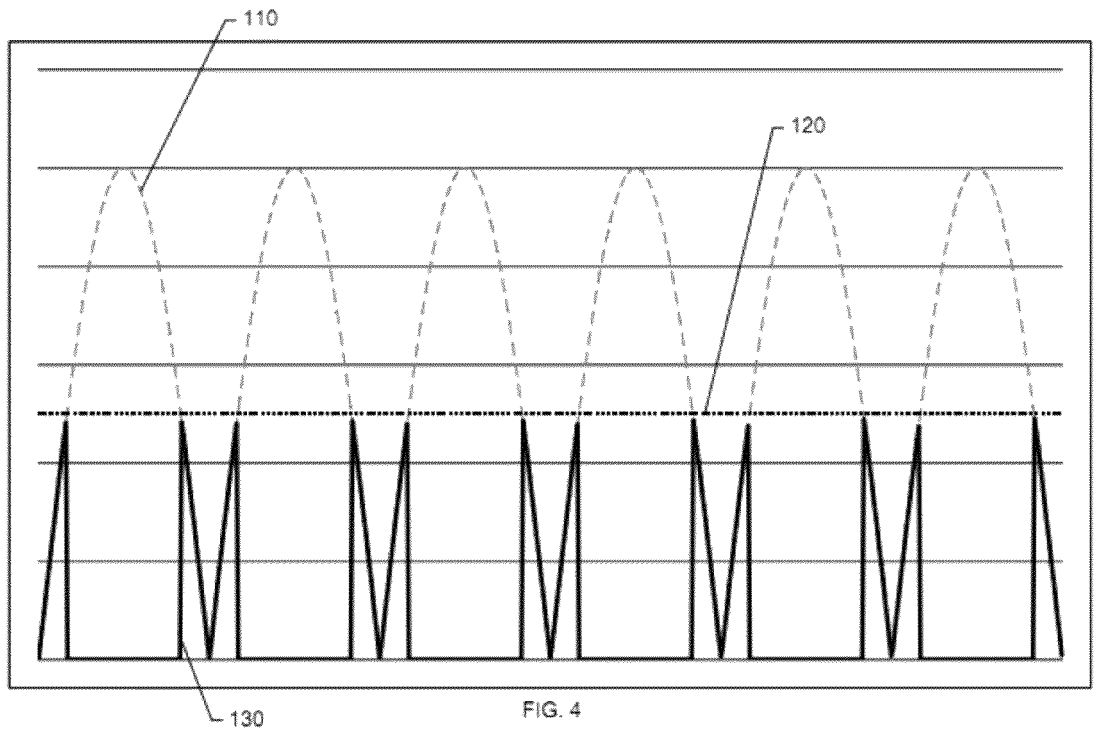
FIG. 4 illustrates a waveform of a second series of pulses utilizing certain aspects of the present inventions.

It can also be seen in FIG. 4 that the second series of pulses 130 may also be a waveform comprising pulses of voltage and/or current. The waveform of the second series of pulses 130 may follow the waveform of the first series of pulses 110, when the voltage of the waveform of the first series of pulses 110 is less than, equal to, or does not exceed the threshold 120. The waveform of the second series of pulses 130 may also drop to zero volts, or nearly zero, when the voltage of the waveform of the first series of pulses 110 is greater than, equal to, or exceeds the threshold 120.

It can also be seen in FIG. 4 that the second series of pulses 130 occurs at a higher frequency than the first series of pulses 110. In one embodiment, the first series of pulses 110 occurs at the first frequency, such as nominally sixty hertz, and the second series of pulses 130 occurs at the second frequency, such as nominally one hundred-twenty hertz. In other words, each pulse of the first series of pulses 110 may be converted into two pulses of the second series of pulses 130, or some other multiple.

In any case, while the first series of pulses exceeds the threshold 120, each pulse of the second series of pulses 130 is preferably of shorter duration than the pulses of the first series of pulses 110. Each pulse of the second series of pulses 130 is also preferably of a second lower voltage than the pulses of the first series of pulses 110. This lower second voltage is controlled by the threshold 120. In other words, peaks of the second voltage of the second series of pulses 130 may be at or near the threshold 120.

Figure 5:
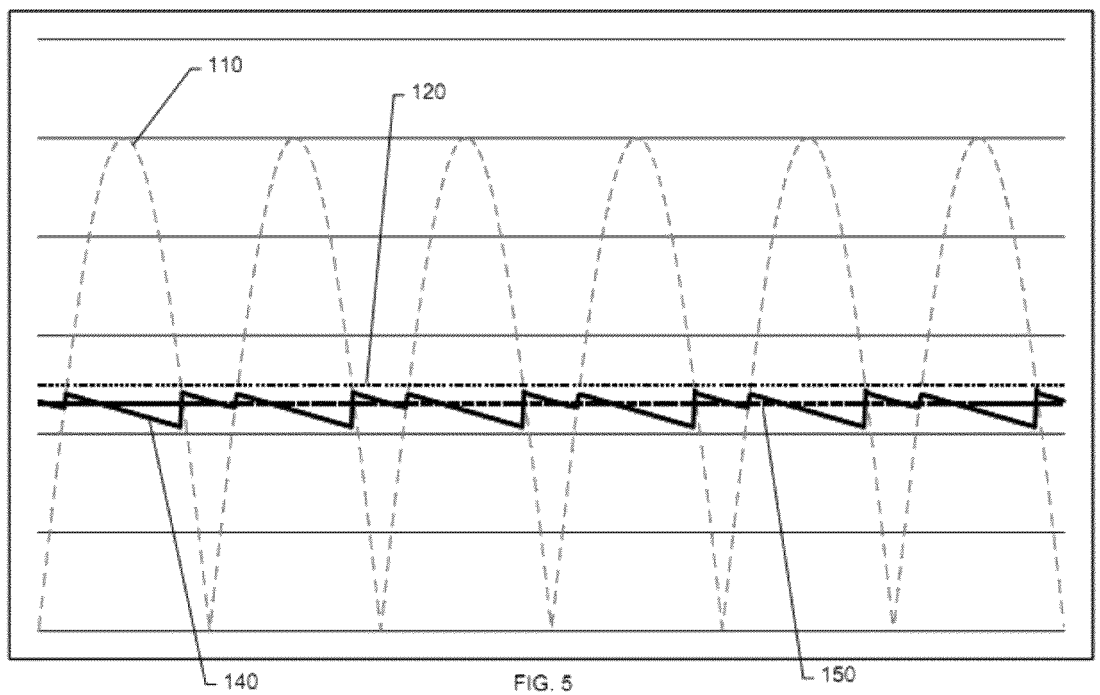
FIG. 5 illustrates a smoothed output power waveform utilizing certain aspects of the present inventions.

In order to better provide a useful output power, referring also the FIG. 5, the second series of pulses 130 may be smoothed to provide a relatively steady direct current output power 140 at the relatively low voltage. The term relatively steady refers to a ripple of the output power 140, and is preferably less than 20%. In a preferred embodiment, the ripple of the relatively steady direct current output power 140 is less than 10%, with an ideal ripple being less than 5%. Thus, the output power 140 may be smoothed to more closely match an ideal output power 150. For example, a series inductor and/or parallel capacitor may be used to provide such a filtered output voltage, current, and/or power.

In any case, the relatively low voltage of the output power 140 may be at or near the second voltage. The terms relatively low and relatively high are meant to reflect their relationship to each other, such that the relatively high voltage is higher than the relatively low voltage. As discussed above, the relatively high voltage may be greater than 265 volts RMS, greater than 480 volts RMS, and/or greater than 600 volts RMS. The relatively low voltage may be approximately 265 volts RMS or less than 265 volts RMS, such as approximately 85 volt RMS. For example, a typical universal input power supply range is 85 VAC to 265 VAC.

Because of the smoothing of the second series of pulses 130 to produce the relatively steady direct current output power 140 at the relatively low voltage, the second voltage of the second series of pulses 130 may be slightly higher than the relatively low voltage of the output power 140. For example, to produce the output power 140 at approximately 265 volts RMS, the second voltage and/or the threshold 120 may be set to between 300 and 265 volts RMS. In one embodiment, the second voltage of the second series of pulses 130 and/or the threshold 120 may be approximately 270 volts RMS to produce a nominally 265 volts RMS relatively steady direct current output power 140. In another embodiment, the second voltage of the second series of pulses 130 and/or the threshold 120 may be approximately 90 volts RMS to produce a nominally 85 volts RMS relatively steady direct current output power 140.

The relationship between the frequency of the input power 100 and the frequency of the output power 140 can be stated in numerous ways. For example, the second frequency of the second series of pulses 130 is an integer multiple of the first frequency of the first series of pulses 110. In fact, in the given example, the second frequency of the second series of pulses 130 is twice the first frequency of the first series of pulses 110. A difference in the relationship may occur depending on how you define each cycle, with respect to the pulses.

More specifically, the input power 100 is expected to comprise a positive pulse and a negative pulse, both of which define one cycle. As shown in the example above, the input power 100 is rectified and thereby converted into the first series of pulses 110. Because those pulses may be identical, one could then define the first frequency of the first series of pulses 110 as being twice that of the input power 100. For example, if the input power 100 is at sixty hertz, one would expect to get one hundred twenty pulses per second as the first series of pulses 110. Because those pulses may be identical, one could then define the first frequency of the first series of pulses 110 as being one hundred twenty hertz.

In the above example, the conversion of the first series of pulses 110 to the second series of pulses 130 would produce two hundred forty pulses per second as the second series of pulses 130. Thus, one might be tempted to define the second frequency of the second series of pulses 130 as being two hundred forty hertz. In this case, the frequency of the output power 140 could be said to be four times the frequency of the input power 100. This is acceptable, and may even be preferred in some applications and/or situations.

However, as shown in FIG. 4, each pulse of the second series of pulses 130 may not be identical, as may be the case with the first series of pulses 110. Therefore, it would be proper to define a complete cycle of the second series of pulses 130 as being two pulses. Thus, it would be proper to define the second frequency of the second series of pulses 130 as being one hundred twenty hertz, in the example given above. As a result, it would be proper to define the frequency of the output power 140 as being two times the frequency of the input power 100.

However, as discussed above, and especially if each pulse of the second series of pulses 130 and/or the output power 140 is identical, one could properly define the frequency of the second series of pulses 130 and/or the output power 140 as being four times that of the input power 100.

FIG. 6 shows a particular embodiment of a system 10 for practicing the above described method and thereby extend the input voltage range of a commercially available Universal Input Power Supply 12, supplying power to a load 14. Typically, the Universal Input Power Supply 12 is designed to receive a power input in a range of approximately 120 VDC (peak of 85 Vrms) to 375 VDC (peak of 265 VAC). At least partially because Universal Input Power Supplies typically employ some capacitance, they often operate properly from somewhat abnormally shaped waveforms, or even DC, as long as their internal capacitance is sufficient. For example, presently available Universal Input Power Supplies may operate properly from 120 to 375 VDC and/or VAC. As discussed above, however, the invention may extend the voltage input range of a commercially available Universal Input Power Supply 12 to 700 VAC or more.

In any case, an input/received power 16, such as alternative current at the relatively high voltage, is input to a full-wave bridge rectifier 18, thereby rectifying the alternating current voltage into the first series of pulses 110, as shown in step E and FIG. 3. The first series of pulses 110 is monitored by a voltage sense circuit 20, as shown in step F. The voltage sense circuit's 20 output is fed into a comparator 22, as shown in step G. If the voltage sense circuit 20 measures less than the threshold 120, such as 350 Vpk, a switching element 24, such as a bipolar junction transmitter, insulated gate bipolar transistor, field effect transistor, and/or other semiconductor, is turned on, or closed, to allow the voltage and current to pass through, as shown in step H. However, if the voltage sense circuit 20 measures greater than the threshold 120, the switching element 24 is turned off, or open, blocking the voltage and current, and thereby protecting the Universal Input Power Supply 12, as shown in step I. More specifically, the comparator 22 may drive a switch driving circuit 26, such as a gate driver or base driving circuit, which controls the switching element 24. In this manner, the first series of pulses 110 may be converted into the second series of pulses 130, as shown in step B.

It can be seen that the duration and voltage of the second series of pulses 130 is limited. A fundamental physics equation states V=L di/dt, which may be reworded as di=dt(V/L). dt of the second series of pulses 130 is fixed, and as can be seen the second series of pulses 130 may be narrow. V is the threshold voltage 120 minus a bulk voltage of an input capacitance of the Universal Power Supply 12, so V is fixed. L is an input inductance of the Universal Power Supply 12, so L is fixed. Therefore, the maximum amount of power that may be provided to an output from the Universal Power Supply 12 may also be fixed.

FIG. 7 shows a block diagram of another embodiment of the system 10 that will output more power from very high input voltages using an output capacitor 28. This capacitor 28 is able to draw extra current from the narrow pulse of the second series of pulses 130 at the same time the Universal Power Supply 12 is drawing power. Once the pulse is gone, the Universal Power Supply 12 is then able to draw more current, or power, from the output capacitor 28.

Figure 8:
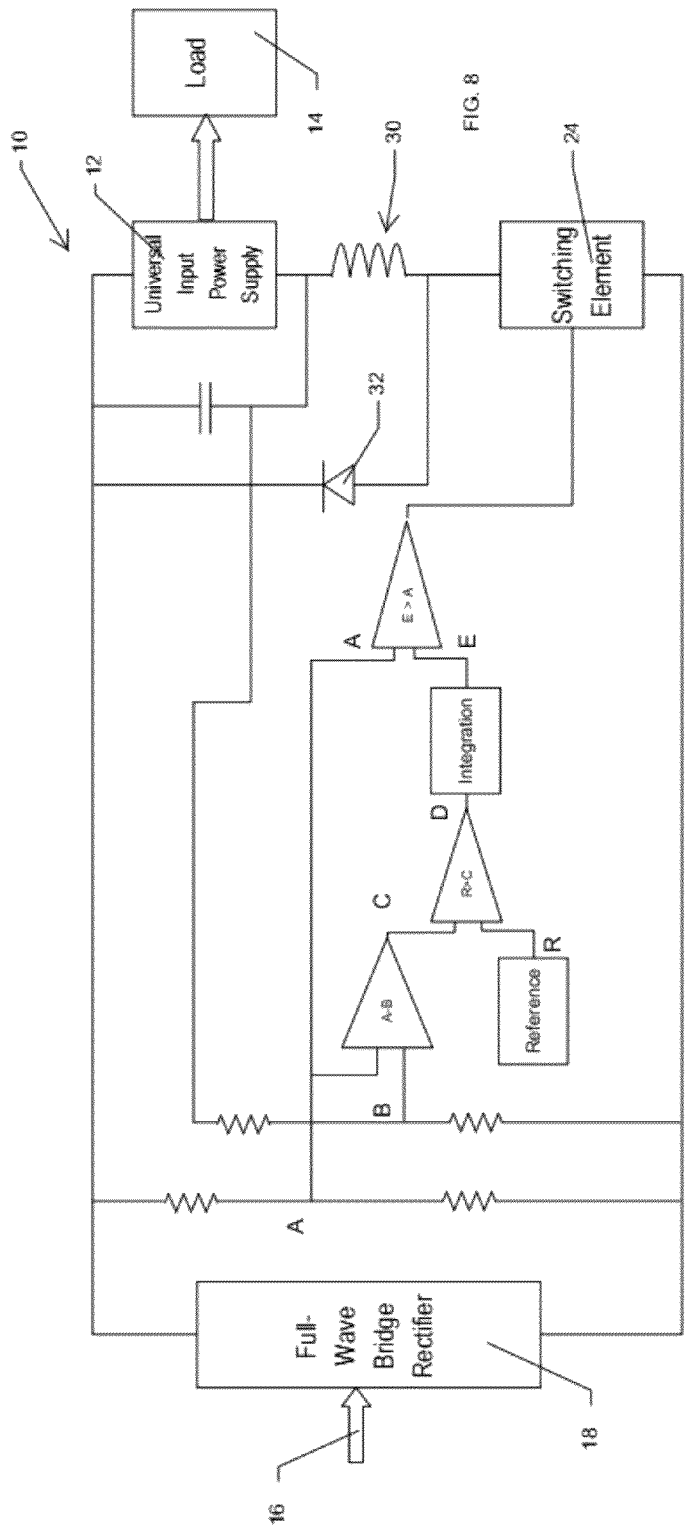
FIG. 8 illustrates a simplified circuit diagram of a third embodiment of a system utilizing certain aspects of the present inventions.

FIG. 8 shows an embodiment of the system 10 that allows sufficient energy to be drawn from the input power 16 to run the Universal Power Supply 12 even if the voltage of the input power 16 is so high that the conduction width, or duration, of each pulse of the second series of pulses 130 becomes very short. In this embodiment, the system 10 switches switching element 24 near the same threshold voltage 120, such as where the rectified voltage is at or about 350V, but is not limited to this single, fixed threshold voltage 120. Should the conduction width, or duration, of the second series of pulses 130 become too small to keep the Universal Input Power Supply 12 operating even with the output capacitor 28, the threshold voltage 120 may be increased, such as above the 350V point. As the threshold voltage 120 rises, longer time is available to draw current from the input power 16. During this time, energy may be stored in an output inductor 30. When the switching element 24 turns off, the current continues to flow through an output diode 32.

In this embodiment, a rectified input voltage A, such as a rectified positive voltage relative to a rectified negative voltage, and a negative offset voltage B, such as an output negative voltage relative to the rectified negative, are sensed. Subtracting the negative offset voltage B from the rectified input voltage A gives an output voltage C, which is fed to the Universal Input Power Supply 12. If a reference voltage R is greater than the output voltage C, then the output voltage C is too low and the threshold voltage 120 can be raised, denoted by a compare signal D being in a high logic state. Integrating the compare signal D will cause a slowly changing threshold signal E to increase or decrease to the voltage where the switching element 24 should change state. Comparing the rectified input voltage A to the threshold signal E will determine the actual point where the switching element 24 should operate, or control the threshold voltage 120.

Figure 9:
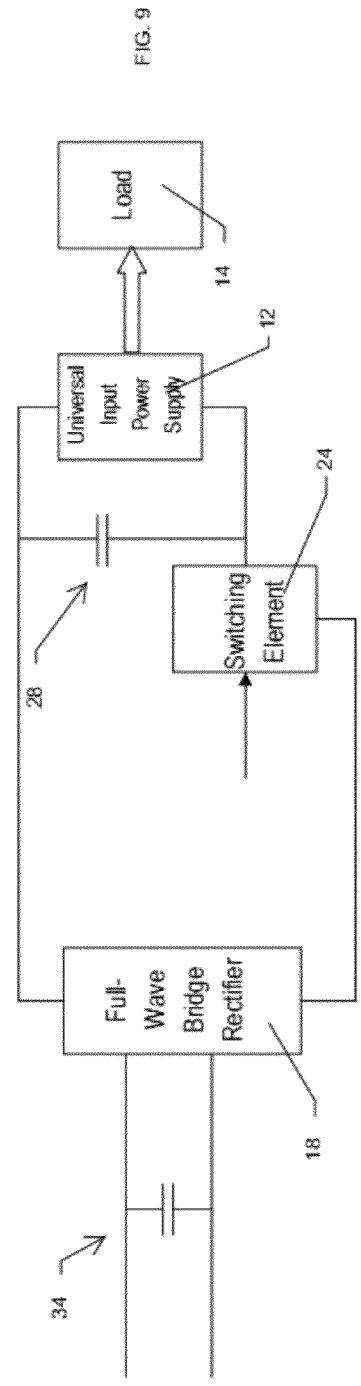
FIG. 9 illustrates a simplified circuit diagram of a fourth embodiment of a system utilizing certain aspects of the present inventions.

If the Universal Input Power Supply 12 and/or the input power 16 has a high input impedance and the load 14 is fairly large, such as 10 watts or more, an embodiment similar to that shown in FIG. 9 may be used. As discussed above, large input voltages on the input power 16 decrease the conduction time of the second series of pulses 130. Large output loads draw more current through the Universal Input Voltage Power Supply 12, and thus the system 10 of the present invention. An input capacitance 34 may be used to draw small currents from the input power 16 and store this energy for the system 10, as needed. An additional benefit of the input capacitance 34 is reduced harmonic distortion on the input power 16. In this respect, the input capacitance 34 may additionally be fed from an input inductance (not shown) to minimize even farther harmonics put back on the input power 16 line.

Figure 10:
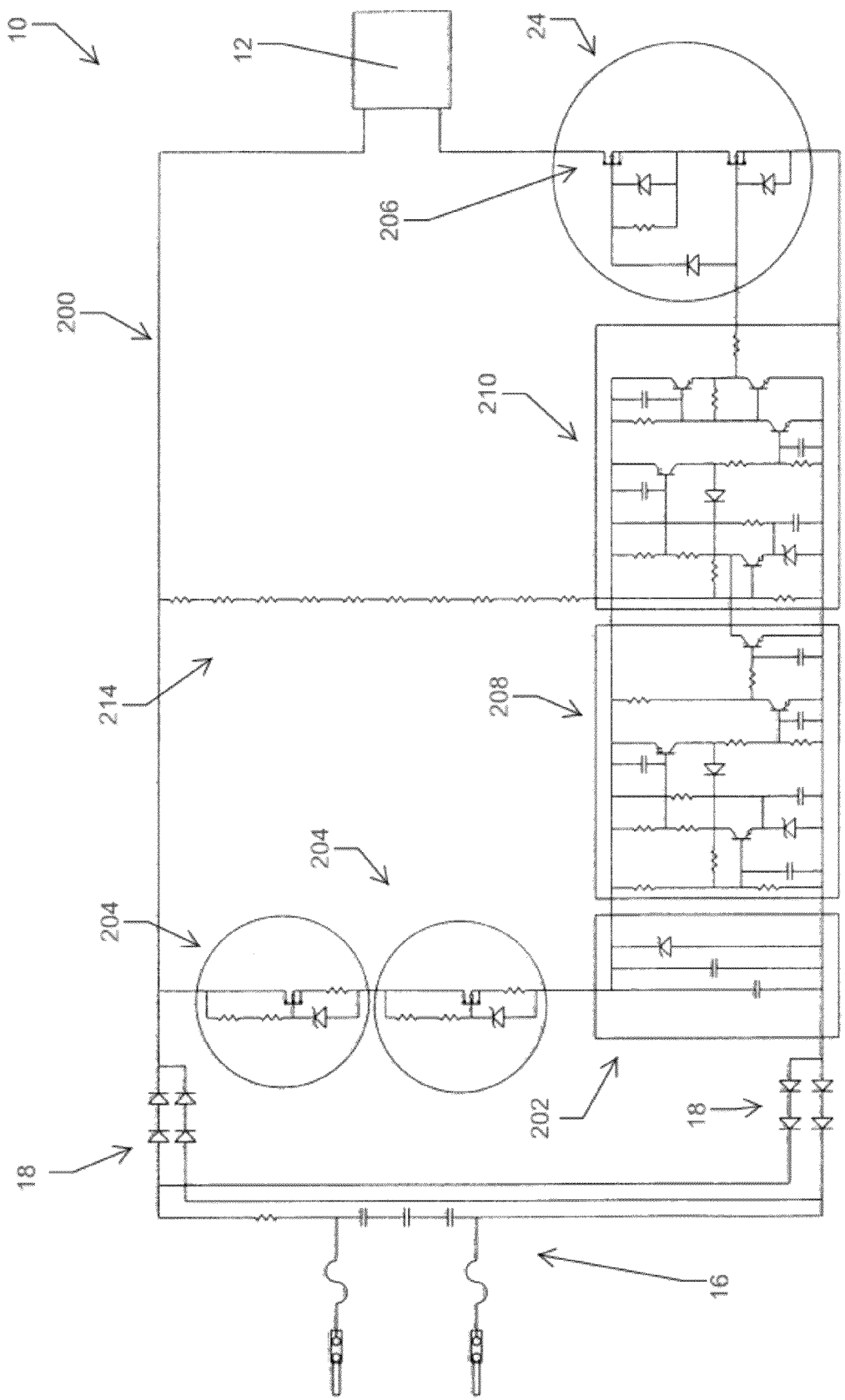
FIG. 10 illustrates a schematic diagram of a particular embodiment of a system utilizing certain aspects of the present inventions.
Figure 11:
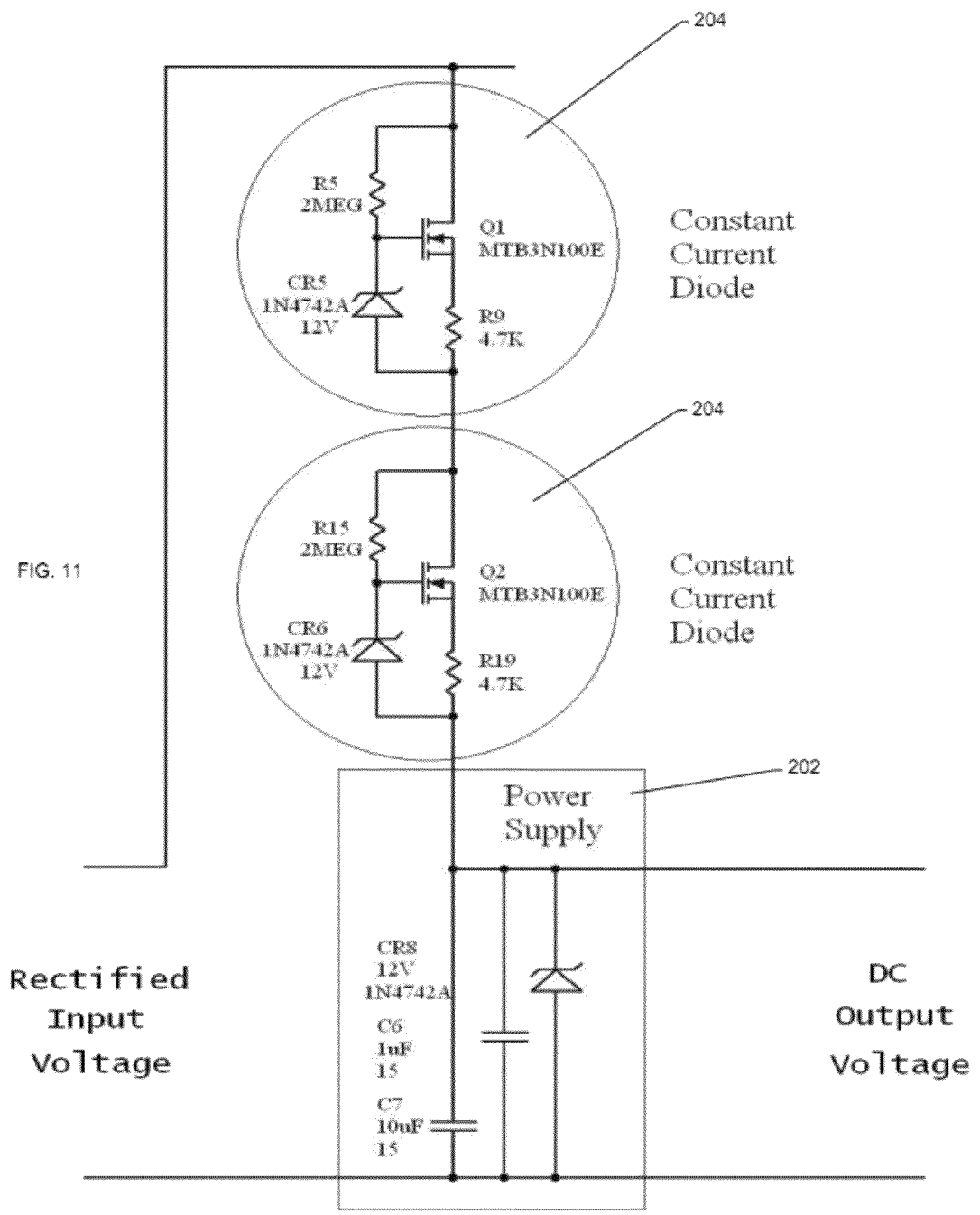
FIG. 11 illustrates an enlarged view of a first portion of the schematic diagram of FIG. 10.

FIG. 10 shows a preferred embodiment 200 of the system 10 of the present invention in more detail. The system 10 as depicted is designed to support a 15 watt Universal Input Voltage Power Supply 12 from a 60 Hz input power source 16 that varies from 100 Vrms to 750 Vrms and higher. FIG. 11 shows an expanded view of a power supply section 202. A constant current diode circuit 204 from the rectified input feeds current into a zener diode CR8. As shown, the zener diode CR8 may be paralleled with an aluminum electrolytic capacitor C7 and a ceramic capacitor C6 to add stability and continued voltage while the rectified voltage drops to zero through zero-crossing at the input power 16.

More specifically, a resistor R5 feeds a gate of a Metal Oxide Silicon Field Effect Transistor (MOSFET) Q1 turning it on. As current flows out of transistor Q1's drain, the current flows through a resistor R9 causing a voltage to be developed across the resistor R9. When the voltage across the resistor R9 less the voltage across a zener diode CR5 overcomes the threshold of transistor Q1, the MOSFET Q1 starts operating in the linear mode. The current developed by this circuit is:

$$\text{Current} = \frac{V_{zener}\ CR5 - V_{gs} - \text{threshold}}{\text{Resistor}\ R9}$$

In some cases, two constant current diodes 204, operating in essentially the same manner, may be placed in series, as shown, in to allow a higher rectified voltage. If one MOSFET starts to become over-voltaged, it will attempt to draw more current that will be limited by the second constant current diode 204. Of course, alternative methods of protecting circuits may be used, such as higher voltage zener diodes across each circuit.

Figure 12:
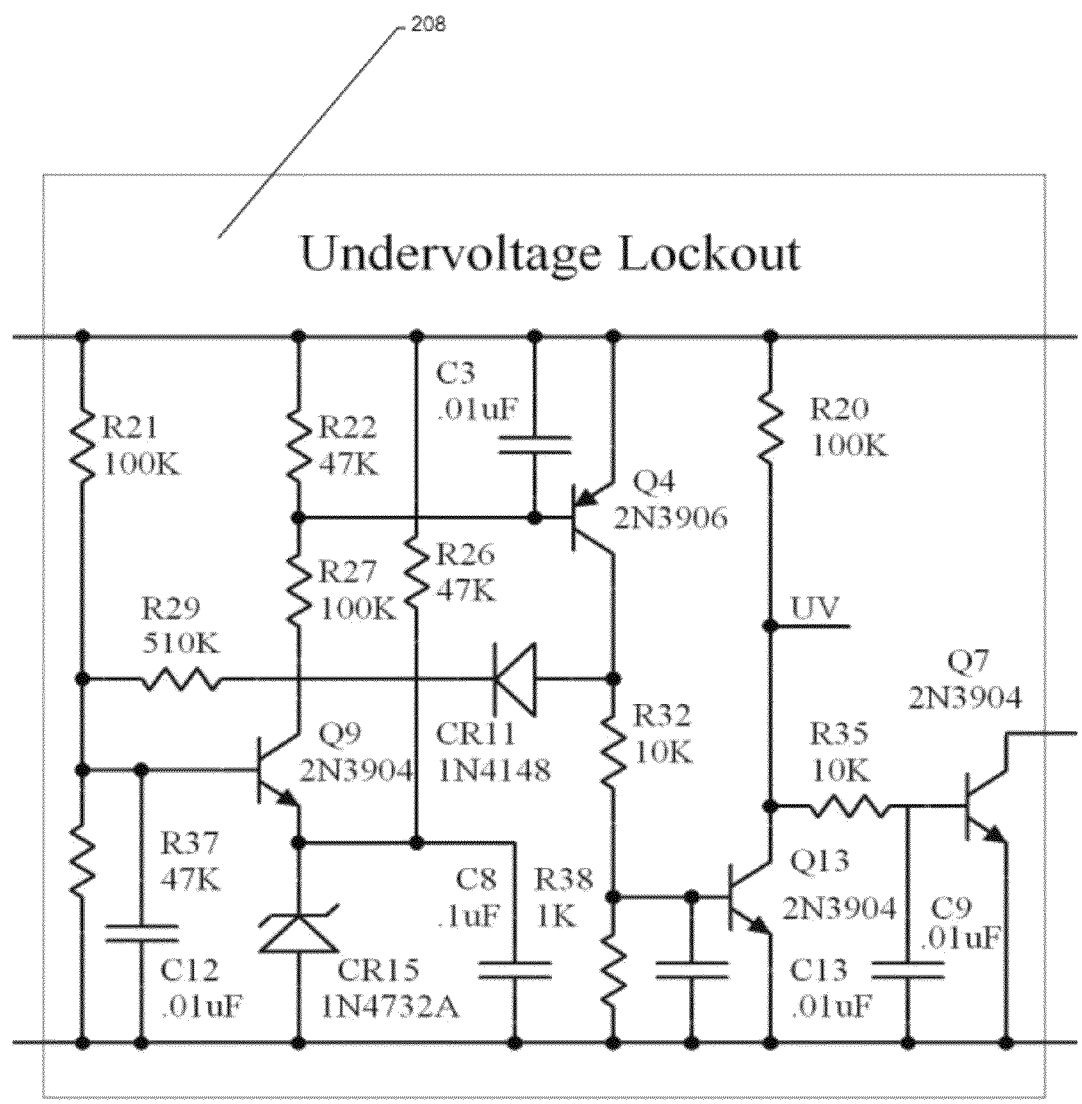
FIG. 12 illustrates an enlarged view of a second portion of the schematic diagram of FIG. 10.

Because this preferred embodiment 200 employs a power MOSFET 206 as the switching element 24, an under-voltage circuit 208 may be included to keep the MOSFET 206 from being driven with a gate-source voltage that is too low, which may cause the power MOSFET 206 to run in a linear region and quickly overheat. As best shown in FIG. 12, the under-voltage circuit 208 employs a resistor divider network comprised of resistors R21 and R37 that measure a control voltage from the power supply 202. Resistor R26 feeds a current into zener diode CR15 filtered by capacitor C8 which develops a voltage reference. The voltage developed by the resistor divider network is then compared against the voltage reference via transistor Q9. When the power supply's 202 voltage rises to a high-enough level for operation, transistor Q9 is activated which turns on transistor Q4 via resistor R27. Resistor R22 is used to keep Q4 turned off during under-voltage. Capacitor C3 may be used to reduce noise-pickup on the base of transistor Q4. When Q4 activates, diode CR11 feeds current through resistor R29 into the resistor divider network causing hysteresis, which may used to form clean switching edges for the switching element 24. Also, when transistor Q4 activates, resistor R32 actives transistor Q13. Resistor R38 keeps transistor Q13 off until current is fed through resistor R32. Capacitor C13 may be used to reduce noise pickup on the base of transistor Q13. Until proper voltage is sensed, resistor R20 and resistor R35 activate Q7 denoting under-voltage. After proper voltage has been detected causing transistor Q13 to activate, Q13's collector shorts out the base-emitter of transistor Q7 allowing the output of the circuit to "open". Capacitor C9 may be added to prevent noise from entering the base of transistor Q7.

Figure 13:
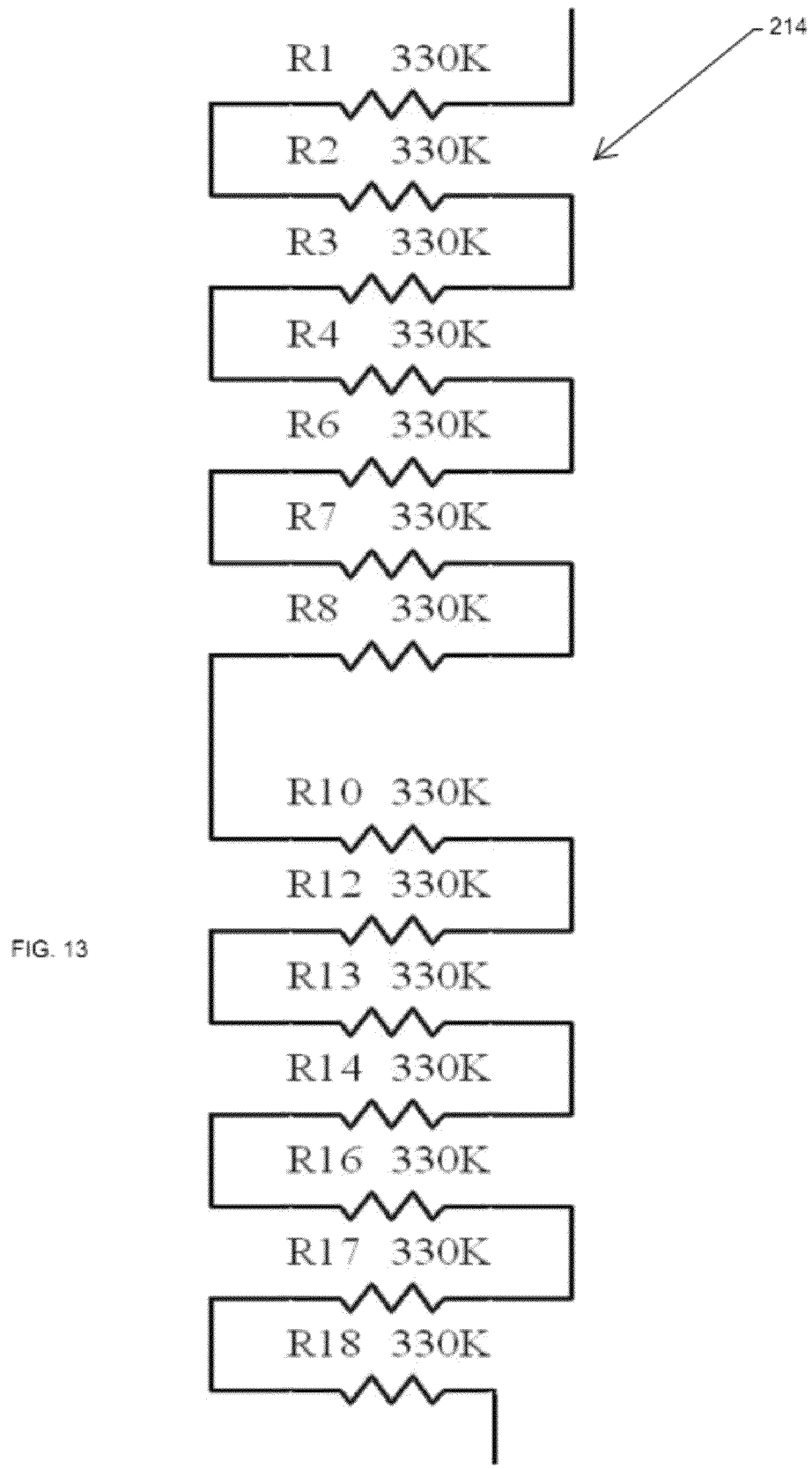
FIG. 13 illustrates an enlarged view of a third portion of the schematic diagram of FIG. 10.

A gate control, or drive circuit 210 may be based off of a resistor divider sense network 212 driven by the rectified voltage. An upper resistor 214 may comprise a network of resistors R1, R2, R3, R4, R6, R7, R8, R10, R12, R13, R14, R16, R17, R18 placed in series as shown in FIG. 13. Multiple resistors in series, as shown, may be used in series to allow more voltage across the entire string, as each individual resistor may have a limited operating voltage.

Figure 14:
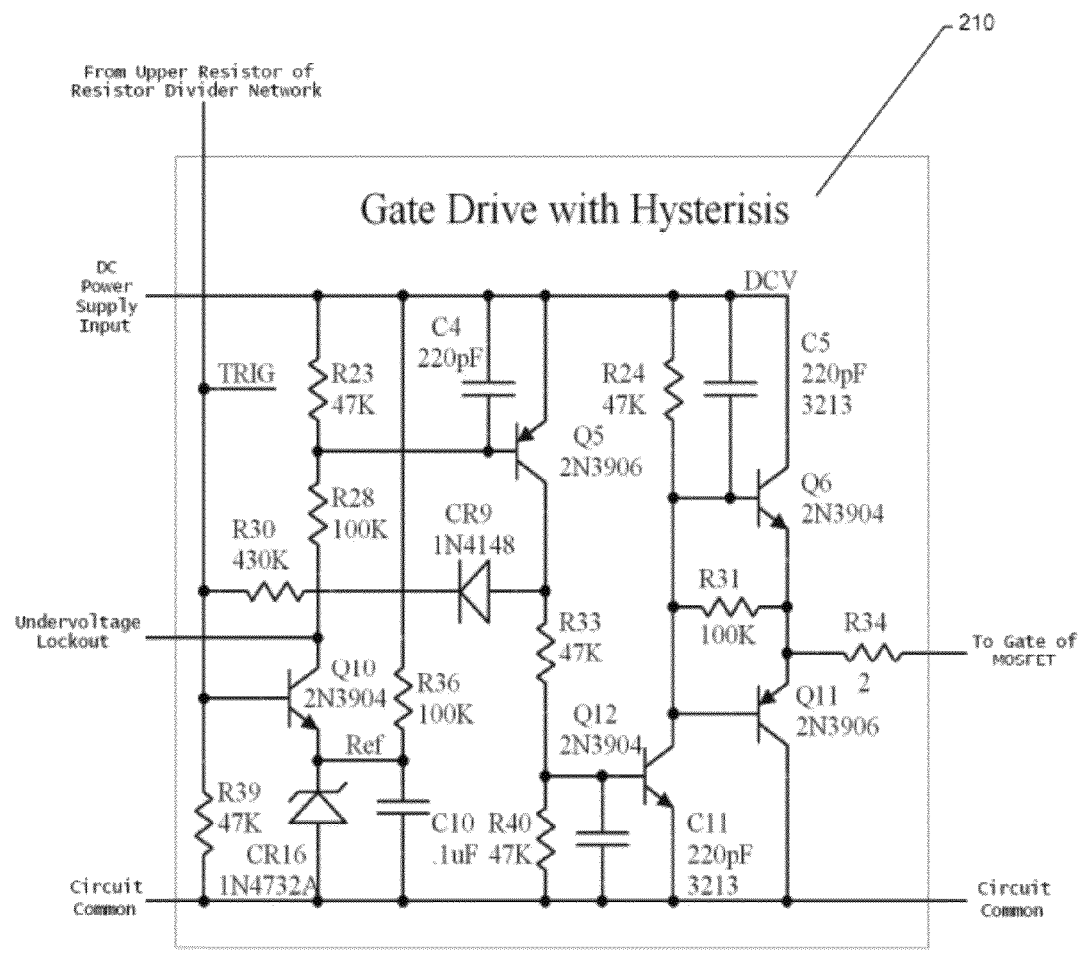
FIG. 14 illustrates an enlarged view of a fourth portion of the schematic diagram of FIG. 10.

Referring also the FIG. 14, the rectified voltage is monitored via the upper resistor 214 and the lower resistor R39 of the resistor divider 212. A voltage from the resistor divider 212 is compared against a reference voltage, such as in a manor similar to that used in the under-voltage circuit 208. When the rectified voltage is less than a preset voltage between 300V and 350V, such as the threshold voltage 150, transistor Q11 will be in the off state. During this off-state, resistor R24 pulls up on the base of transistor Q6 causing current to flow out of resistor R34 and turn on the power MOSFET 206. Capacitor C5 may be added to reduce noise from entering transistor Q6's base. When the rectified voltage is greater than the reference value, transistor Q12 is active causing current to flow out of the base of transistor Q11 causing current to flow back into resistor R34 causing the power MOSFET 206 to turn off. Resistor R31 may be added to finish either pulling up or pulling down the voltage of resistor R34 after the transistors have done their work. Resistor R34 may be added to separate the gate drive from the power MOSFET's 206 input capacitance, which could otherwise cause unwanted and harmful oscillations.

Figure 15:
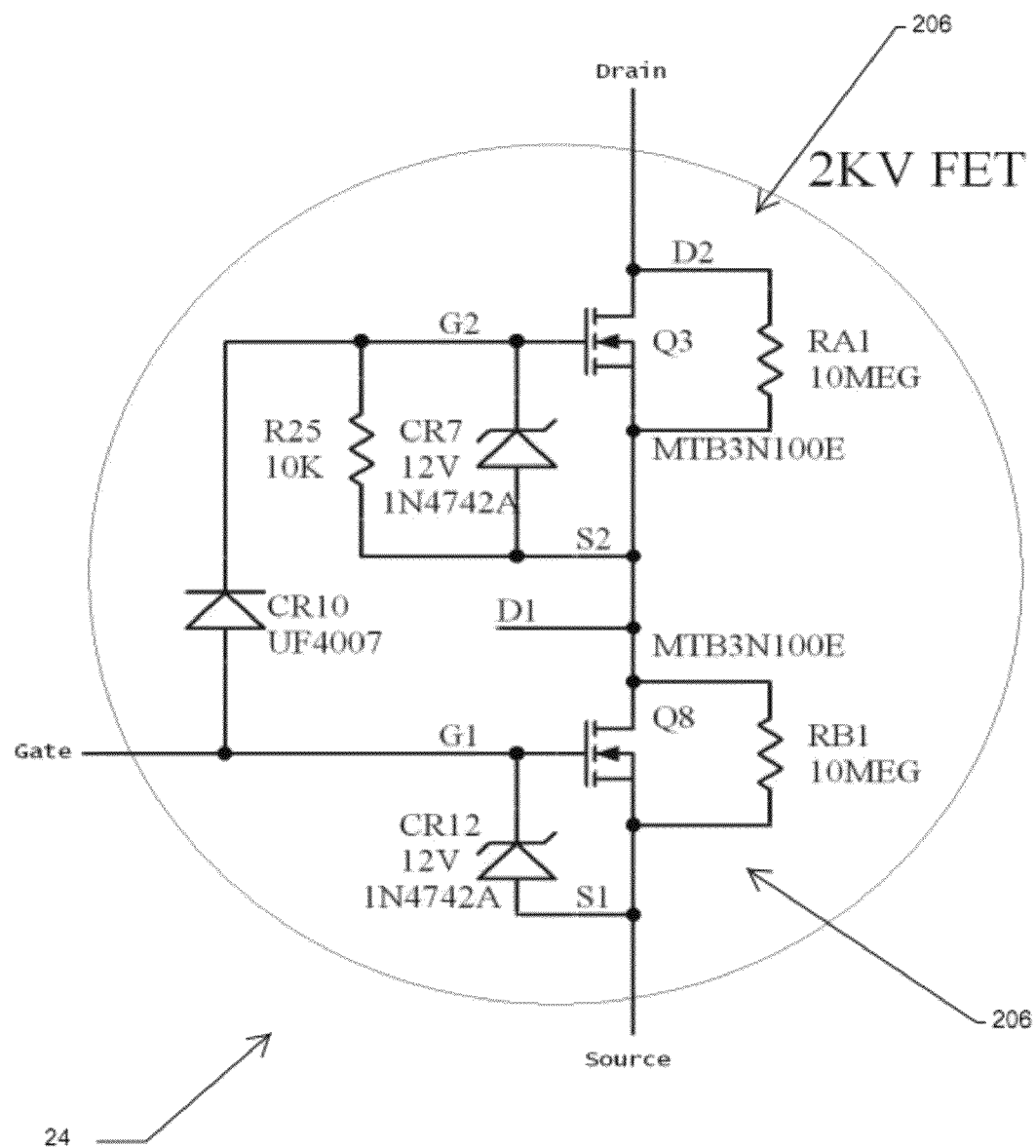
FIG. 15 illustrates an enlarged view of a fifth portion of the schematic diagram of FIG. 10.

MOSFETs rated at over 1,000 volts are uncommon. 2,000 volt rated MOSFETs are simply not commonly available. Thus, the switching element 24, as shown in FIG. 15, provides a unique solution using two or more MOSFETs 206 in series to double the operating voltage without expensive gate drives. The switching element 24 only needs to switch at a low multiple, such as two times or four times, of the input frequency. For example, with a 60 Hertz (Hz) input power 16, in one embodiment, the switching element 22 will only need to switch at 120 Hz or 240 Hz. In any case, the switching element 24 is expected to operate at less than 1,000 Hz, and thus the second frequency is expected to be less than 1,000 Hz.

Transistor Q8 may operate normally with its gate driven from the previously-discussed gate drive and its source connected to circuit common or rectified negative in this case. However, transistor Q3's operation is unique in that resistor R25 connected between transistor Q3's gate and source turns transistor Q3 off when not requested to turn be on. When the gate drive goes high, transistor Q8's gate is turned on causing transistor Q8's drain to approach transistor Q8's source. Transistor Q8's drain pulls transistor Q3's source to nearly the same voltage as transistor Q8's source while diode CR10 raises transistor Q3's gate to source voltage high enough to bias transistor Q8 on. A schottky diode may be used as diode CR10 to help force a higher transistor Q8 gate-source voltage. Diodes CR7 and CR12 may be used to prevent transistor Q3 and Q8's gate to source voltage from being overdriven accidentally, if needed. FIGS. 23-27 show alternative configurations to those of FIGS. 10-15.

Figure 16:
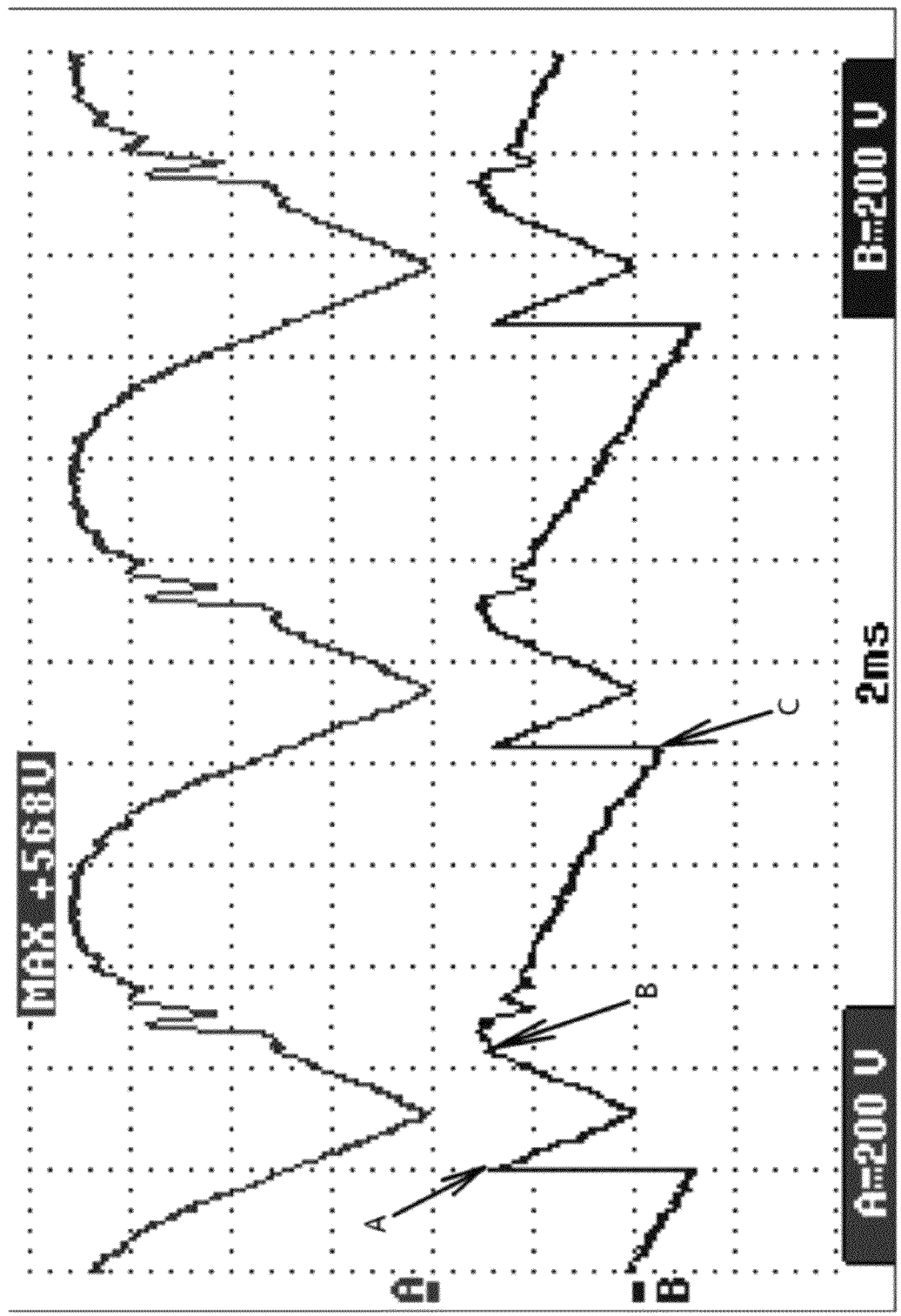
FIG. 16 illustrates a waveform produced by the circuit shown in the schematic diagram of FIG. 10.

FIG. 16 shows a waveform from the above-described circuit running a 10 watt Universal Input Power Supply 12 loaded to 10 watts with 500 Vrms input. Waveform A shows the rectified voltage waveform, such as a waveform of the first series of pulses 110. Waveform B is the waveform measured at the Universal Input Voltage Power Supply's 12 input terminals, such as the relatively steady direct current power output 140, after some smoothing, as shown in step C. At point A, the voltage of the waveform of the first series of pulses 110 has dropped low enough for the system 10 to pass the voltage and current along to the Universal Power Supply 12, as shown in step H. Transistors Q3 and Q8 stay activated from point A until point B where the rectified input increases in voltage far enough for the control circuit to shut off transistors Q3 and Q8, thereby blocking the voltage and current along to the Universal Power Supply 12, as shown in step I. Waveform B from point B until point C continues to use output capacitor 28 to supply the Universal Power Supply 12. At point C, the rectified input voltage, such as the voltage of the waveform of the first series of pulses 110, has once again dropped enough to start the cycle over again.

Figure 17:
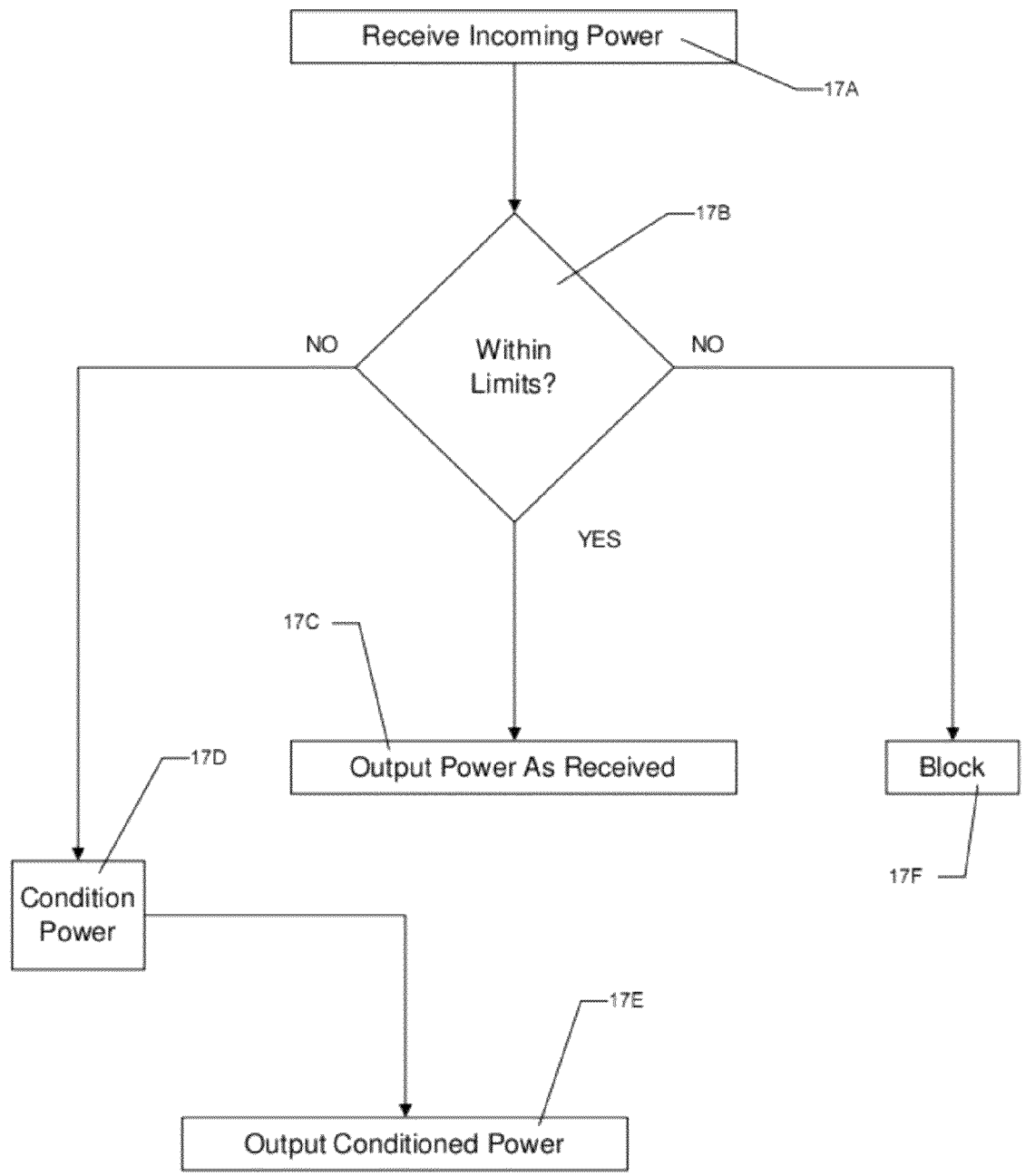
FIG. 17 illustrates a flow chart of a method utilizing certain aspects of the present inventions.

In some embodiment, as shown in FIG. 17, the present invention may receive incoming power, as shown in step 17A. Then, the present invention may determine if that incoming power is within certain limits, as shown in step 17B. For example, those limits may relate to voltage, current, frequency, power quality. Those limits may be predefined by requirements of downstream equipment, such as a universal power supply that can only tolerate up to 265 volts. In any case, if the incoming power is within the limits, the present invention may output that power substantially as received, as shown in step 17C. Alternatively, the present invention may condition the received power and output the conditioned power, if the incoming power is outside the limits, as shown in step 17D. For example, as discussed above, the present invention may receive power at above 480 volts RMS and reduce the voltage to at or below 265 volts. Then, the present invention may output that conditioned power, as shown in step 17E. In some cases, the present invention may simply block the received power, as shown in step 17F. For example, the system of the present invention may simply block received power at above 265 volts DC.

Figure 18:
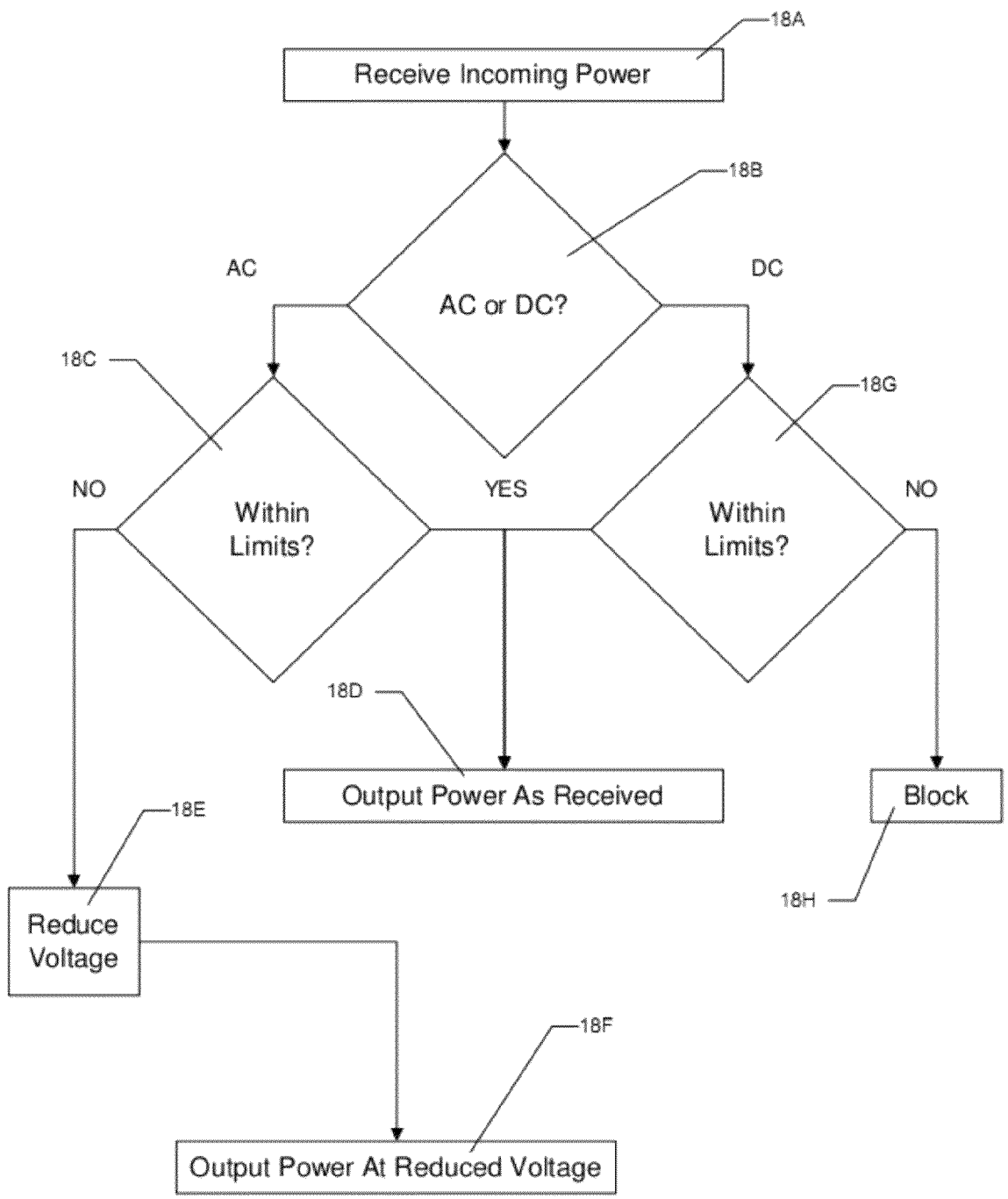
FIG. 18 illustrates another flow chart of another method utilizing certain aspects of the present inventions.

In some embodiments, as shown in FIG. 18, the present invention may receive incoming power, as shown in step 18A. Then, the present invention may determine if that incoming power is alternating current (AC) or direct current (DC), as shown in step 18B. If the incoming power is AC, the present invention may determine if that incoming power is within certain limits, as discussed above, and as shown in step 18C. If the incoming power is within the limits, the present invention may output that power substantially as received, as shown in step 18D. Alternatively, the present invention may condition the received power and output the conditioned power, such as reduce the voltage, as shown in step 18E. Then, the present invention may output that conditioned power, as shown in step 18F.

Similarly, if the incoming power is DC, the present invention may determine if that incoming power is within certain limits, as discussed above, and as shown in step 18G. If the incoming power is within the limits, the present invention may output that power substantially as received, as shown in step 18D. Alternatively, the present invention may simply block the received power, as shown in step 18H. Of course, some of the steps may be combined and/or operate automatically as a function of the system of the present invention. For example, steps 18B, 18C, and/or 18G may be combined and/or processed inherently according to the design of the system. More specifically, without actually detecting whether the incoming power was AC or DC, some of the functionality described above would inherently block DC above the threshold 120, while conditioning AC above the same threshold 120 to produce a conditioned output power 140.

The invention may also be useful in connection with three-phase input power. One with ordinary skill in the art may envision one or more topologies that use the neutral line. However, the topology shown in FIG. 19 and described here remains flexible and is able to run from either a 3-Phase Wye or 3-Phase Delta power input.

Figure 19:
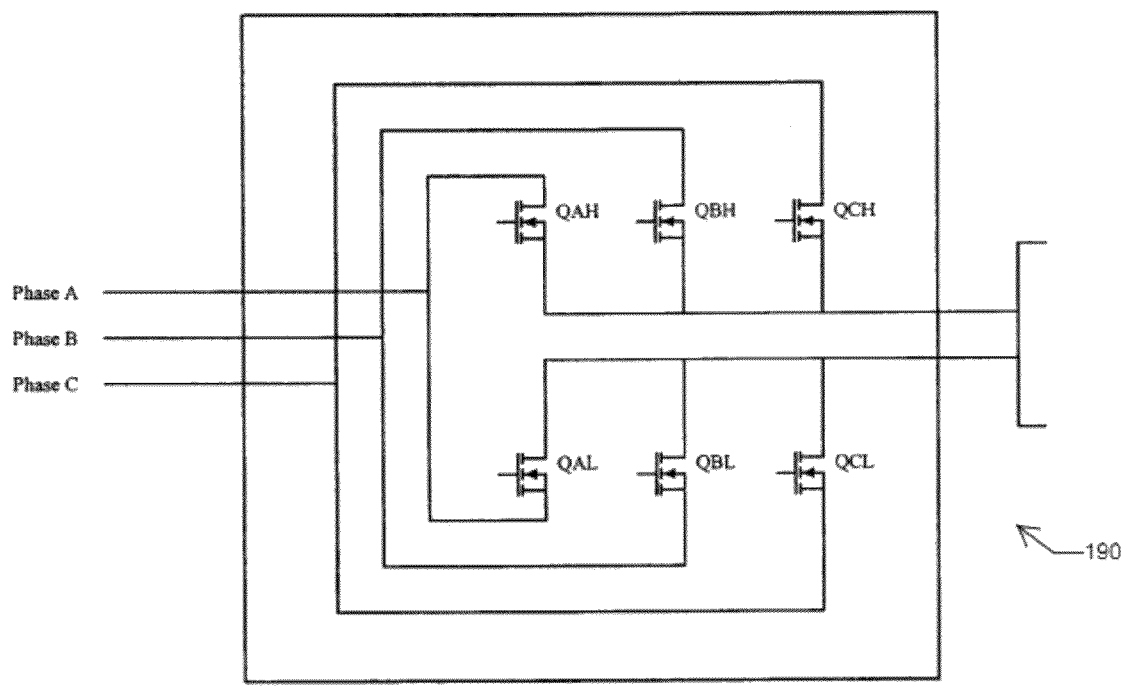
FIG. 19 illustrates a simplified circuit diagram of an embodiment of a portion of a system utilizing certain aspects of the present inventions.

More specifically, if the input power 16 is three-phase, the rectifier 18 may resemble, and/or other components of the may be combined in a manner similar to, that shown in FIG. 19. To best use the three phase input, a full bridge structure is shown. For example, the system 10 may include six or more transistors 190, interconnected, or otherwise configured, to rectify the three-phase input power 16. One might use twelve or more transistors 190, in series pairs, to accommodate higher voltages than the individual transistors 190 are rated for.

Figure 20:
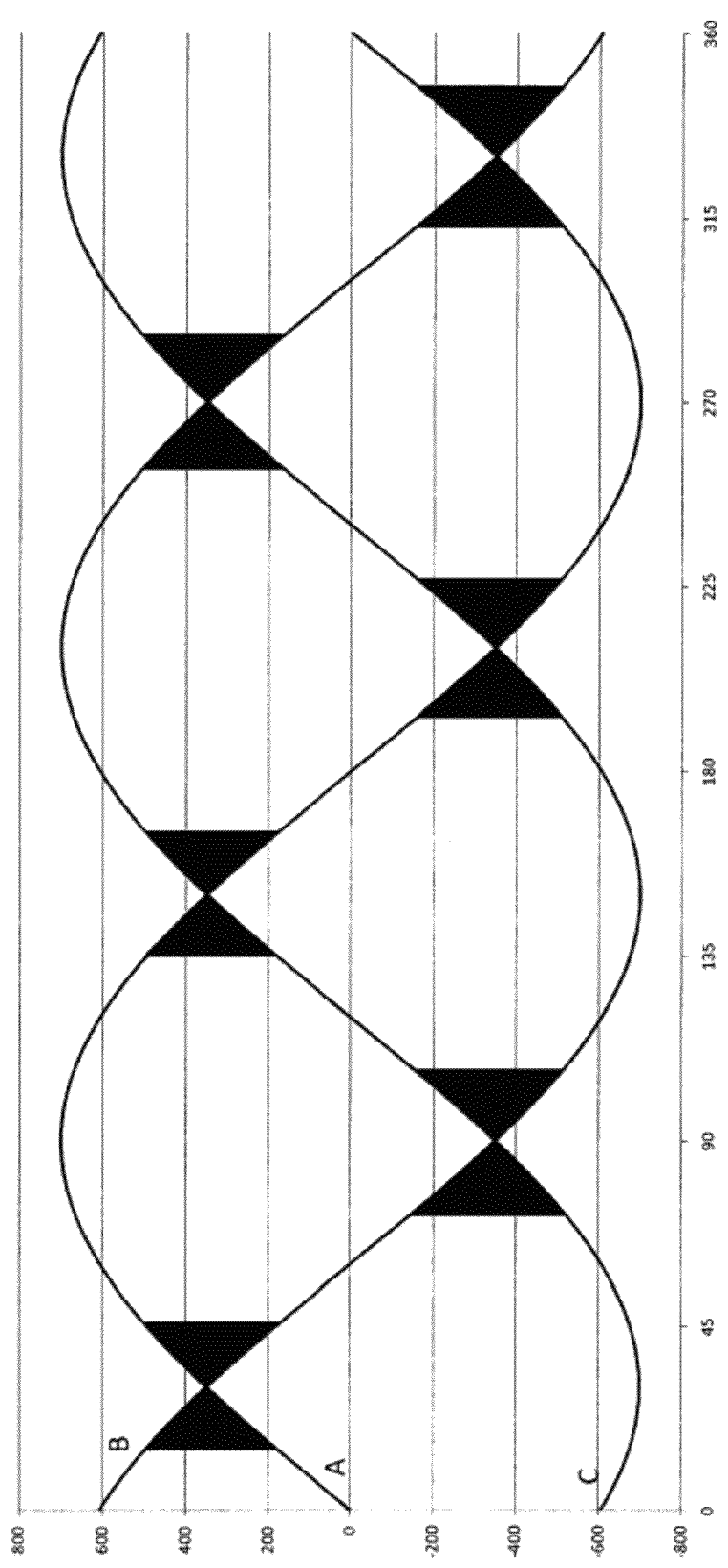
FIG. 20 illustrates a three-phase input voltage waveform showing conduction areas.
Figure 21:
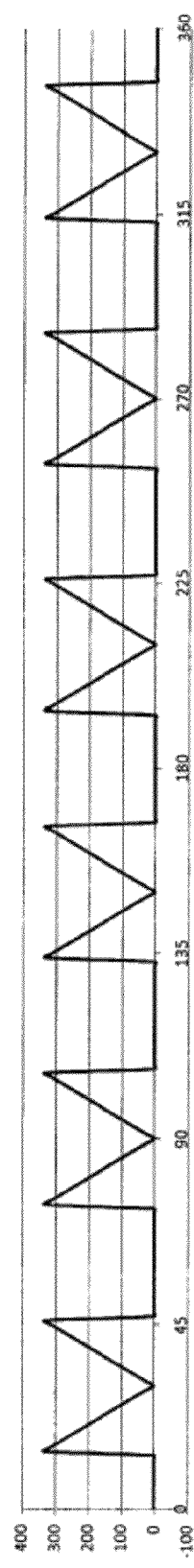
FIG. 21 illustrates a waveform of a second series of pulses that may be generated by the system of the present invention when exposed to the three-phase input voltage waveform of FIG. 20 utilizing certain aspects of the present inventions.

In any case, the transistors 190 may also be controlled to limit conduction time to produce the conduction areas, of the input waveform(s), shown in FIG. 20. Such control may produce the second series of pulses shown in FIG. 21. With this configuration, the control circuit may choose the best set of phases to draw power from and in which direction. With higher voltages on the input power 16, the conduction areas will be smaller. However, with lower voltages on the input power 16, the conduction areas will be larger, potentially creating an almost direct current output waveform.

Some advantages of using a three-phase input power 16, over a single-phase input power 16, include lower harmonic distortion and the added function of possible continued operation should one phase be lost. For example, in the event of an "open" or missing phase, the system 10 will continue to operate in an acceptable manner. The resulting waveform will most likely look fairly odd with a few spurious spikes here and there when the "open" phase is actually selected to draw power from. The system 10 will quickly figure out this was a worthless attempt and jump to the next set of phases. One disadvantage of using a three-phase input power 16 is a more complicated and thus a more expensive control circuit.

Although three-phase is common industrial power today, any multi-phase input power 16 may be used in a similar circuit. Multi-phase power has been shown to sometimes be advantageous while running motors. Multi-phase power in this circuit would assist in the derivation of a smoother output.

Figure 22:
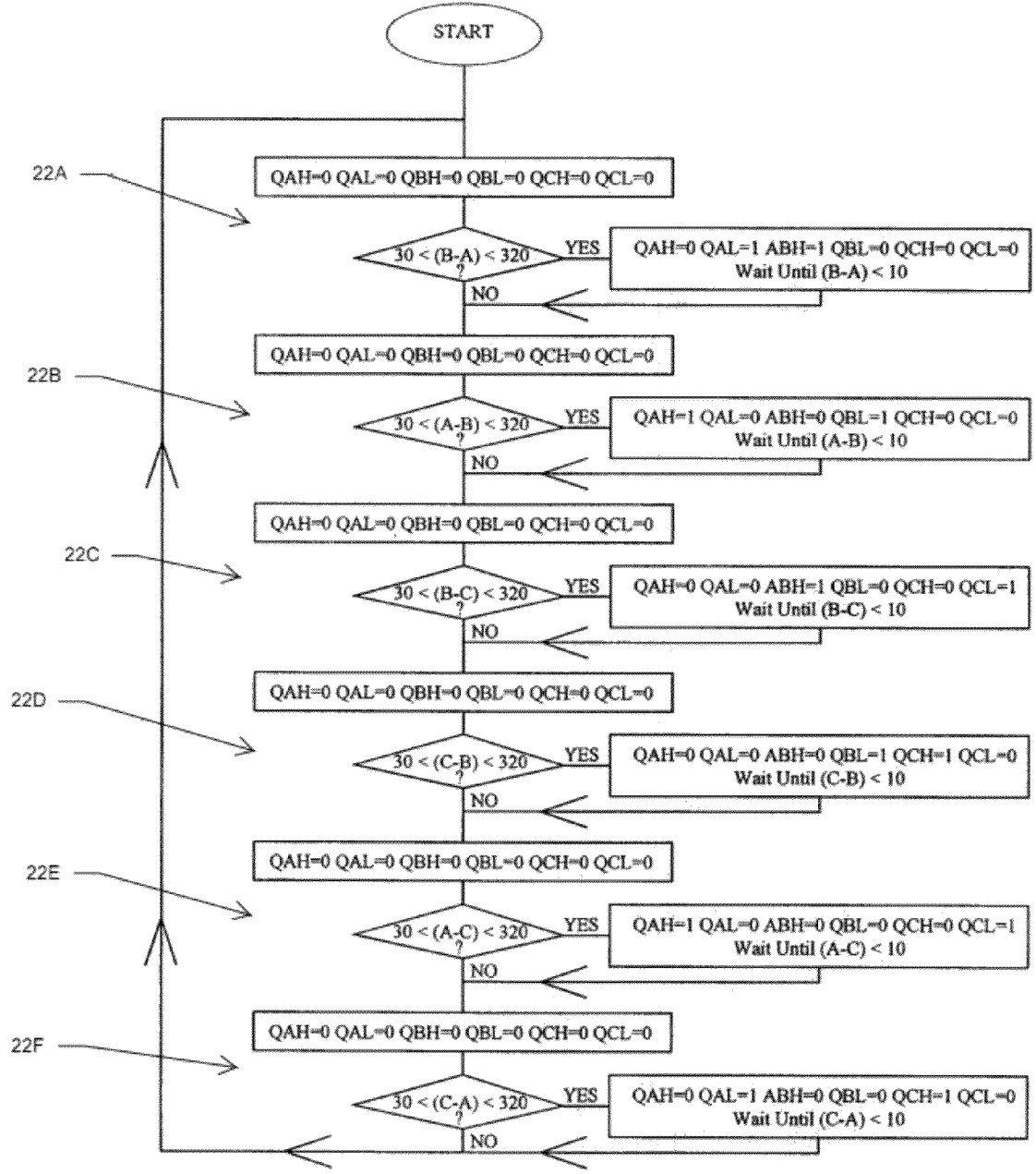
FIG. 22 illustrates a flow chart of a method of the system of the present invention when exposed to the three-phase input voltage waveform of FIG. 20 utilizing certain aspects of the present inventions.
Figure 23:
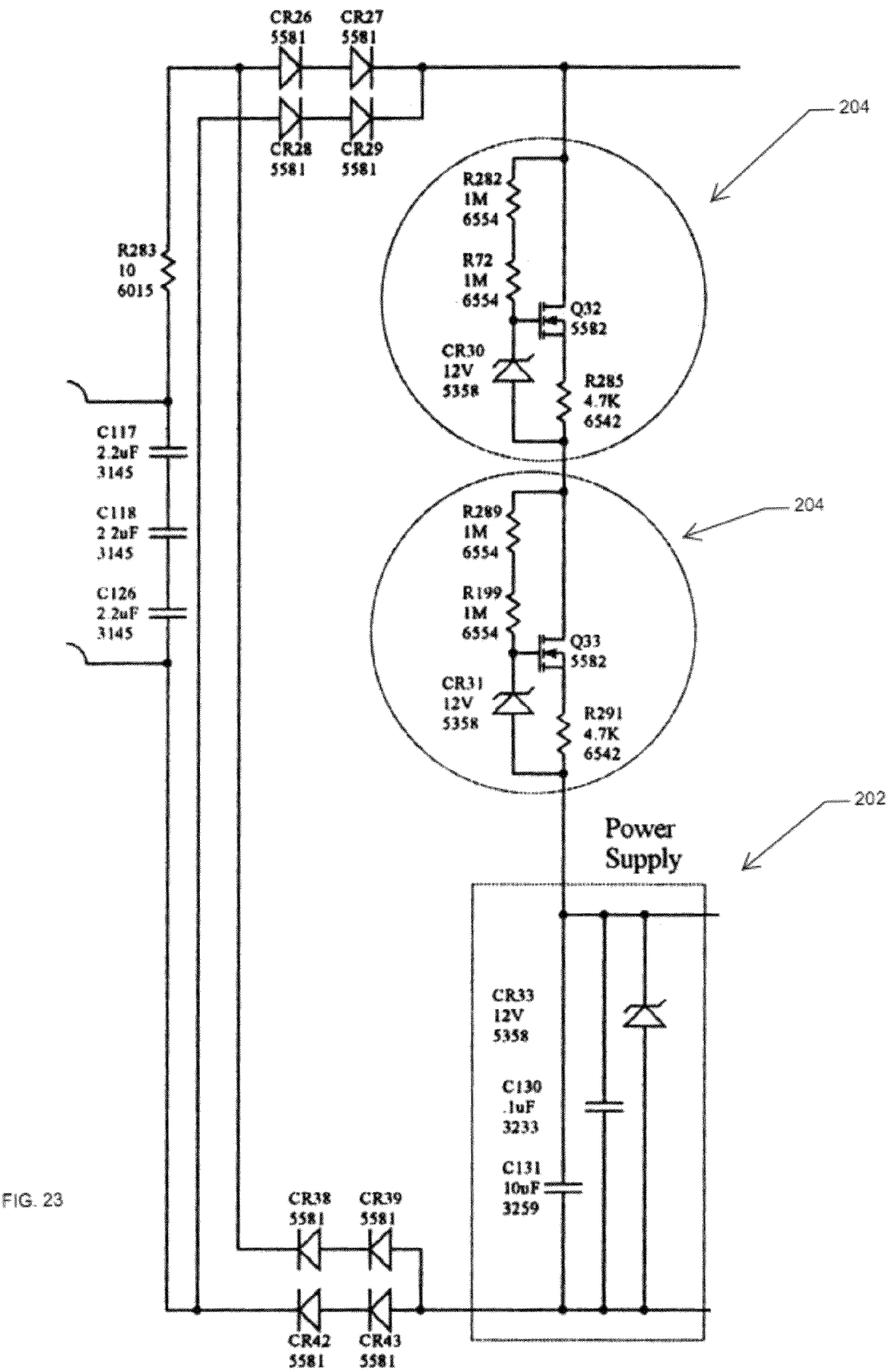
FIG. 23 illustrates an enlarged view of an alternative first portion of the schematic diagram of FIG. 10.
Figure 24:
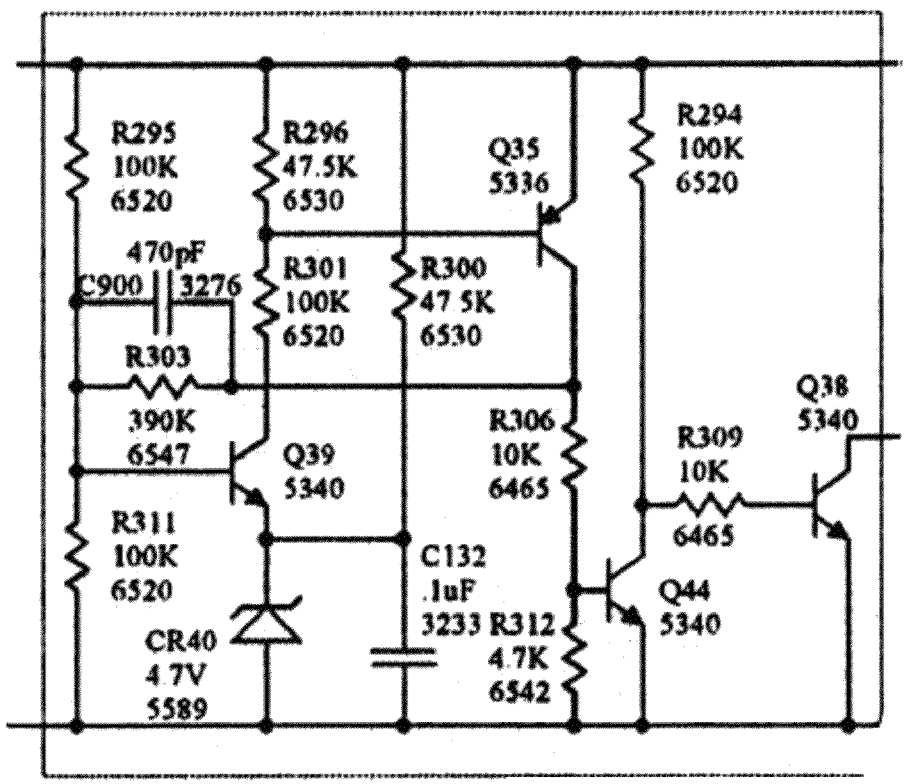
FIG. 24 illustrates an enlarged view of an alternative second portion of the schematic diagram of FIG. 10.
Figure 25:
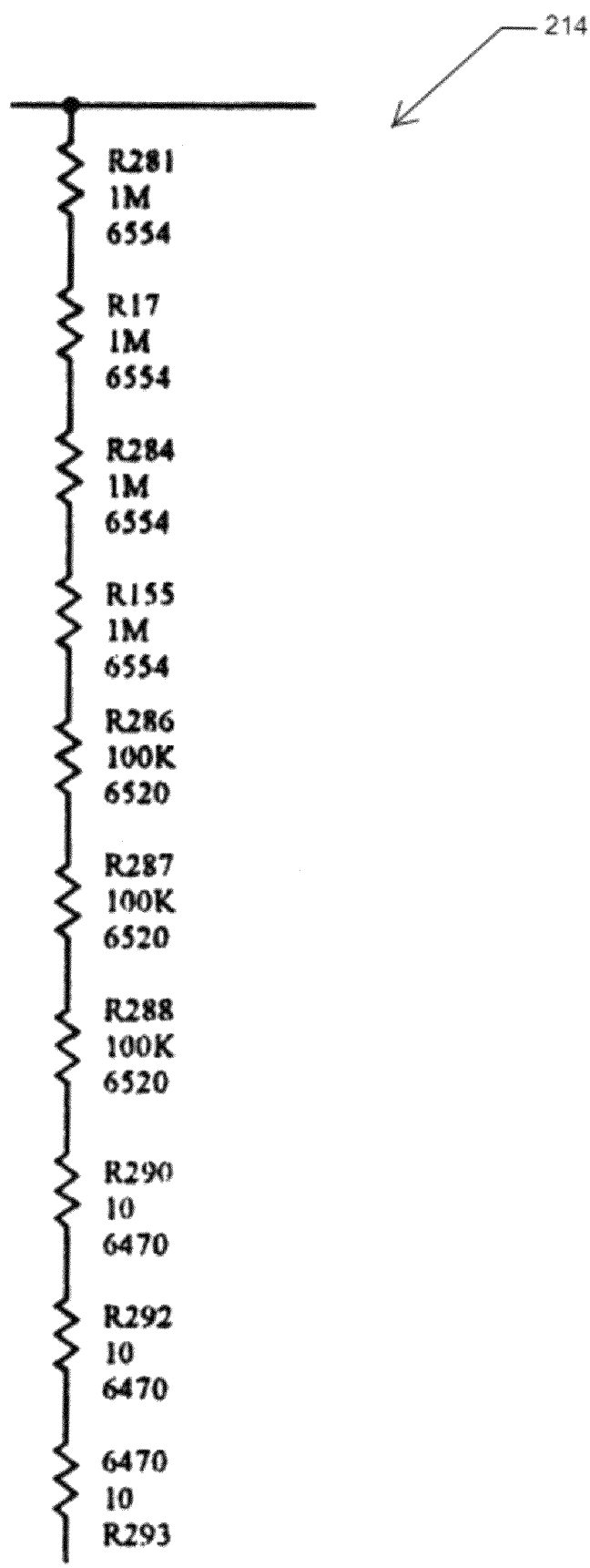
FIG. 25 illustrates an enlarged view of an alternative third portion of the schematic diagram of FIG. 10.
Figure 26:
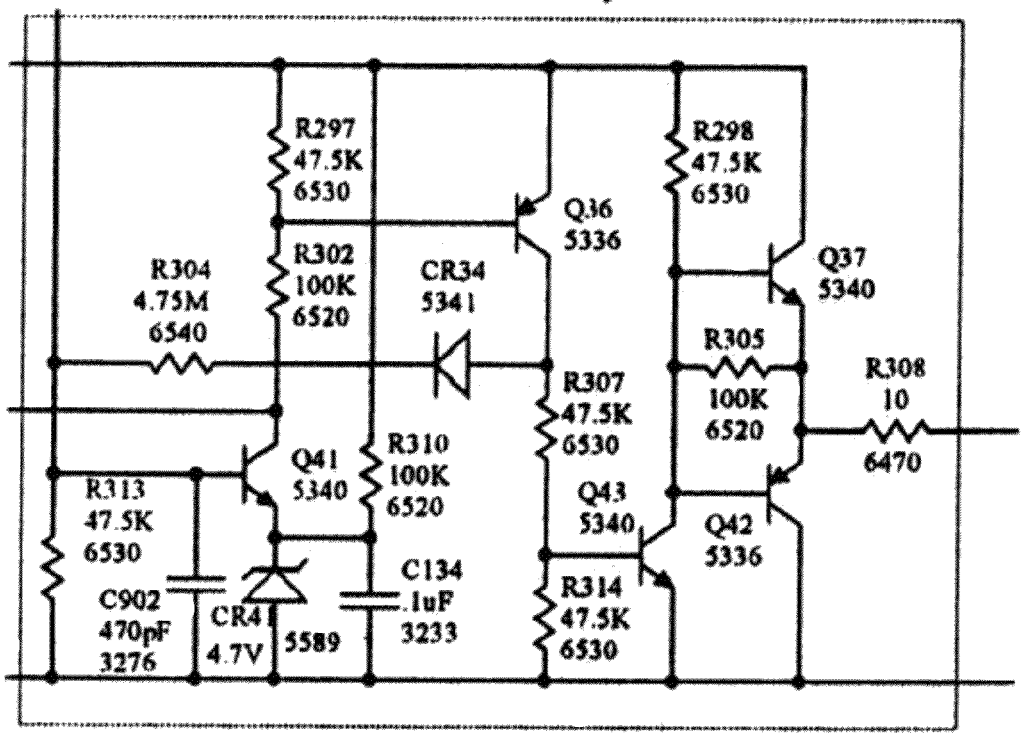
FIG. 26 illustrates an enlarged view of an alternative fourth portion of the schematic diagram of FIG. 10.
Figure 27:
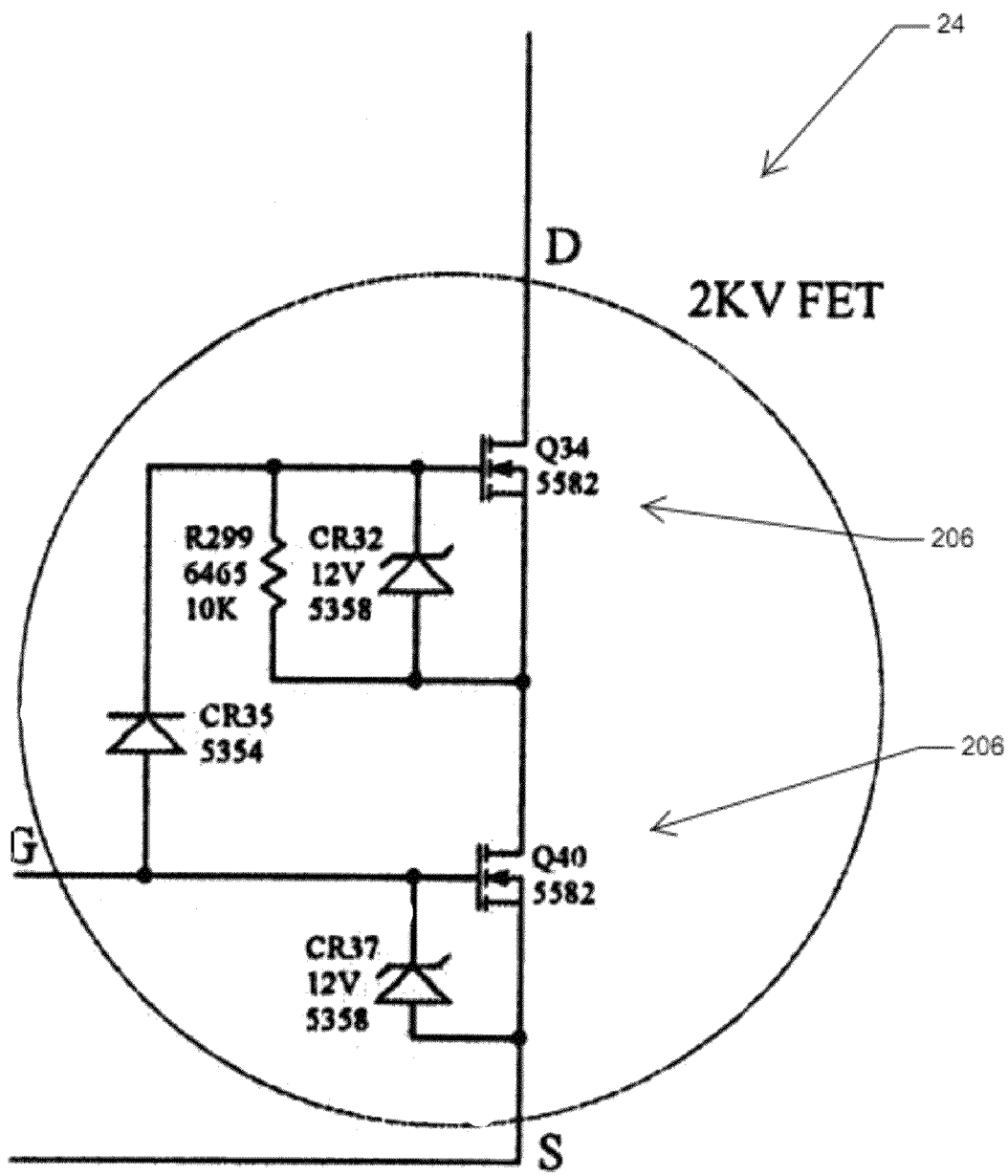
FIG. 27 illustrates an enlarged view of an alternative fifth portion of the schematic diagram of FIG. 10.

Such an embodiment may, for example, follow the flow chart of FIG. 22. While FIG. 22 is merely an example, FIG. 22 provides sample voltage references and corresponding transistor states that may be used in conjunction with the system 10 of FIG. 19, thereby producing the waveform of FIG. 21, from the waveform of FIG. 20. For example, if the voltage from phase/line B to phase/line A of FIG. 19 and FIG. 20 is between 30 volts and 320 volts, QAH may be turned off, QAL may be turned on, QBH may be turned on, QBL may be turned off, QCH may be turned off, and QCL may be turned off, as shown in step 22A. Otherwise, each transistor 190 may be turned off. If the voltage from phase/line A to phase/line B of FIG. 19 and FIG. 20 is between 30 volts and 320 volts, QAH may be turned on, QAL may be turned off, QBH may be turned off, QBL may be turned on, QCH may be turned off, and QCL may be turned off, as shown in step 22B. Otherwise, each transistor 190 may be turned off. If the voltage from phase/line B to phase/line C of FIG. 19 and FIG. 20 is between 30 volts and 320 volts, QAH may be turned off, QAL may be turned off, QBH may be turned on, QBL may be turned off, QCH may be turned off, and QCL may be turned on, as shown in step 22C. Otherwise, each transistor 190 may be turned off. If the voltage from phase/line C to phase/line B of FIG. 19 and FIG. 20 is between 30 volts and 320 volts, QAH may be turned off, QAL may be turned off, QBH may be turned off, QBL may be turned on, QCH may be turned on, and QCL may be turned off, as shown in step 22D. Otherwise, each transistor 190 may be turned off. If the voltage from phase/line A to phase/line C of FIG. 19 and FIG. 20 is between 30 volts and 320 volts, QAH may be turned on, QAL may be turned off, QBH may be turned off, QBL may be turned off, QCH may be turned off, and QCL may be turned on, as shown in step 22E. Otherwise, each transistor 190 may be turned off. If the voltage from phase/line C to phase/line A of FIG. 19 and FIG. 20 is between 30 volts and 320 volts, QAH may be turned off, QAL may be turned on, QBH may be turned off, QBL may be turned off, QCH may be turned on, and QCL may be turned off, as shown in step 22F. Otherwise, each transistor 190 may be turned off.

For example if, at a given moment in time, phase C measures 160 volts more than phase B, the control circuit may chose to engage QCH and QAL. This would apply 160 volts to the load, or power supply, 12 being driven. Further, during a significant input over voltage condition when all three input phases are working, there could be 12 different sets of commutations for each cycle, or period, of the input power 16. It can be seen that a control circuit for the system 10 will likely need to operate at an operating frequency and/or sampling rate of many times, if not hundreds of times, the frequency of the input power 16, which may be 60 or 50 hertz (Hz).

In the example provided by FIG. 22, all transistors 190, or other switches, were turned off in between changing conduction phases. This may or may not be necessary depending on the actual circuits used. Advantageously, the shown topology can overcome phase to phase shorting. Added diodes in series with each transistor 190 may be used in some circuits to simplify the control.

Figure 28:
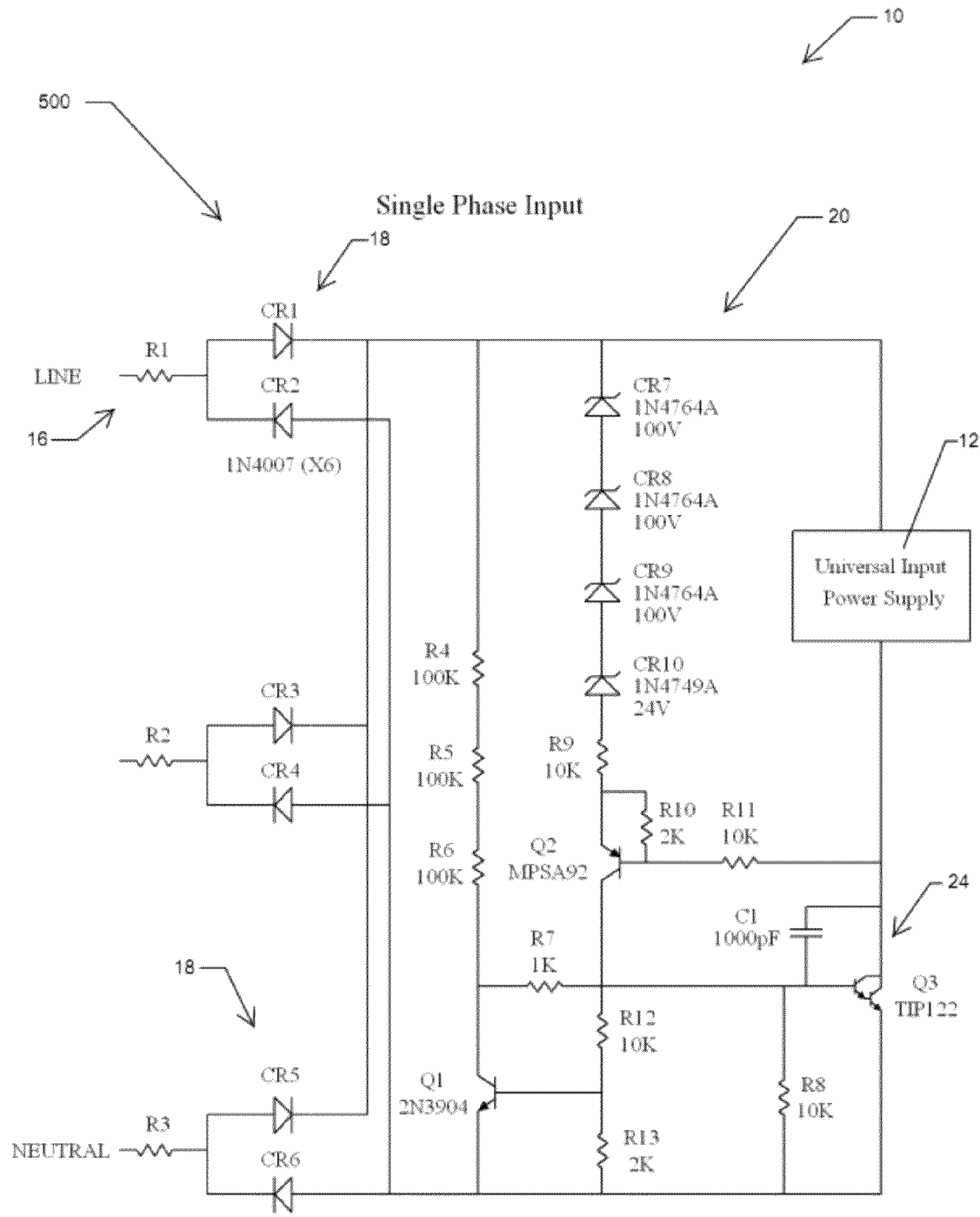
FIG. 28 illustrates a simplified circuit diagram of a fifth embodiment of a system utilizing certain aspects of the present inventions.

FIG. 28 shows another preferred embodiment 500 of the system 10 of the present invention in more detail. The system 10 as depicted is designed to support a 15 watt Universal Input Voltage Power Supply 12 from a 60 Hz input power source 16 that may vary from 85 Vrms to 750 Vrms or higher. In this embodiment 500, the system 10 limits the output voltage to the power supply 12 to an acceptable limit, such as 330 VAC, while supplying necessary current to operate the power supply 12.

This embodiment 500 causes minimal harmonics, as power is drawn from the line during most of the sine-wave. This embodiment 500 may also essentially provide pass-thru power, when the input power source 16 normally provides usable power to the power supply 12, thereby accommodating a higher capacity power supply 12, while protecting the power supply 12 from abnormal high voltage conditions. Furthermore, this embodiment 500 is especially adept at providing usable power to the power supply 12, during temporary voltage swells and/or phase loss on the input power source 16.

Figure 29:
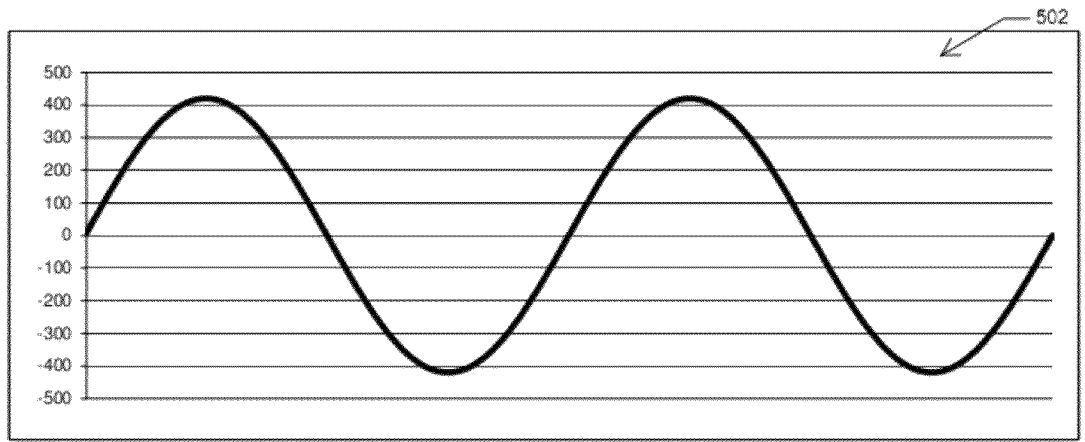
FIG. 29 illustrates an input voltage waveform, such as for use with the fifth embodiment of FIG. 28.
Figure 30:
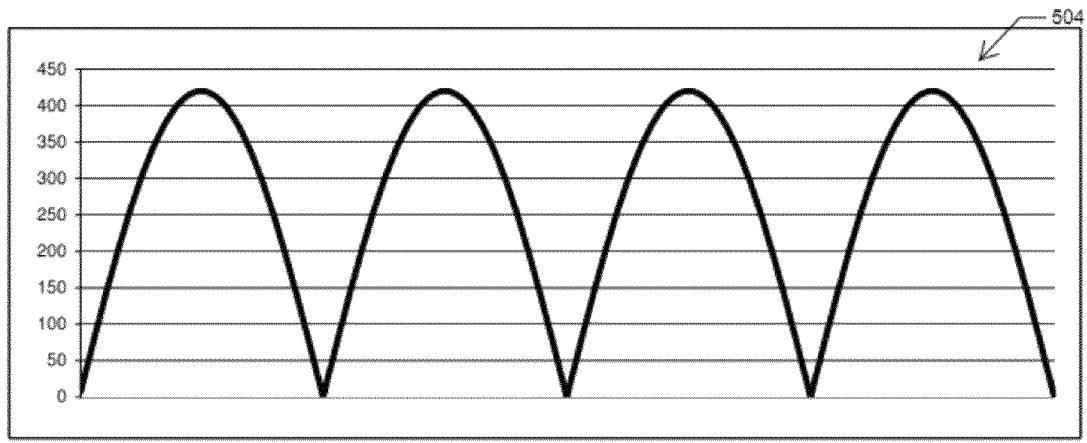
FIG. 30 illustrates a rectified input voltage waveform, such as for use with the fifth embodiment of FIG. 28.
Figure 31:
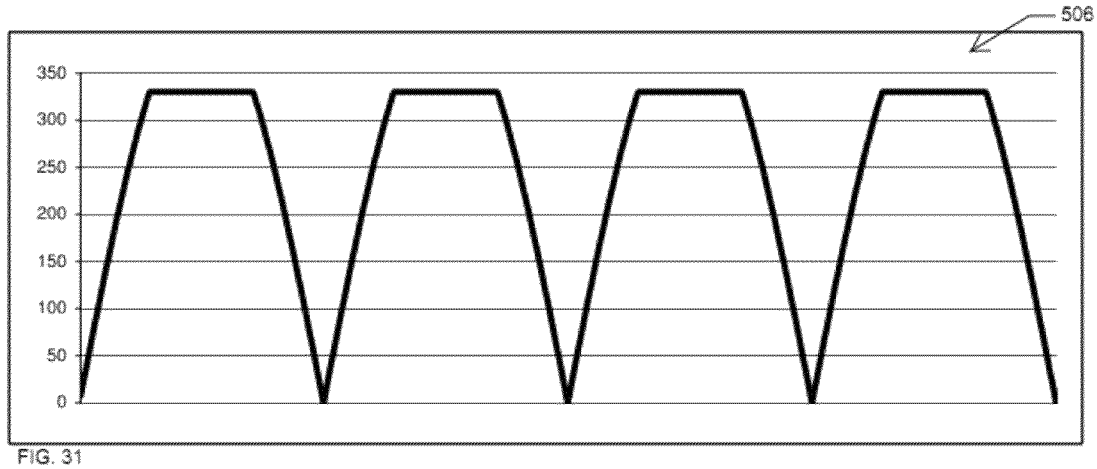
FIG. 31 illustrates a voltage limited waveform, such as that produced by the fifth embodiment of FIG. 28 utilizing certain aspects of the present inventions.

In any case, an input/received power 16, such as an alternating current 502, shown in FIG. 29, is input to a full-wave bridge rectifier 18 to produce a rectified input voltage 504, as shown in FIG. 30. If a voltage sense circuit 20 measures less than the threshold 120, such as 330 Vpk, a switching element 24, such as a bipolar junction transmitter, insulated gate bipolar transistor, field effect transistor, and/or other semiconductor, is turned on, or closed, to allow the voltage and current to pass through, in full saturation mode. However, if the voltage sense circuit 20 measures greater than the threshold 120, the switching element 24 is throttled to its linear mode, thereby dropping the excess voltage across the switching element 24 and providing a voltage limited output 506 to the Universal Input Power Supply 12, as shown in FIG. 31.

In operation, current normally flows through resistors R4, R5, R6 and R7 to the base of the switching element 24 (also denoted as Q3) thus turning Q3 on. The positive rectified voltage feeds one terminal of the Universal Input Voltage Power Supply 12. The other terminal is fed through Q3's collector/emitter circuit to the rectified negative. With Q3 turned on, in full saturation mode, the power supply 12 sees the full rectified voltage, as provided by the input power source 16.

As shown in this embodiment, the voltage sense circuit 20 may comprise a number of series connected zener diodes CR7, CR8, and CR9, rated at 100V, as well as CR10, which is rated at 24V. The voltage sense circuit 20 (CR7-CR10) monitors the voltage across the Universal Input Power Supply 12. When the voltage across the Universal Input Power Supply 12 exceeds the sum of the voltage ratings of the zener diodes CR7-CR10, of the voltage sense circuit 20, transistor Q2 conducts. Transistor Q2 then feeds current into transistor Q1's base via resistor R12. Transistor Q1 then diverts a small amount of current to the rectified negative, through resistor R7, thereby reducing the voltage seen at transistor Q3's base and throttling transistor Q3 in its linear mode. In this manner, the voltage dropped across transistor Q3 can be varied to the extent the rectified voltage of the input power source 16 exceeds the threshold 120. While Q3 is depicted as being connected to the rectified negative, the switching element 24 may be connected to the rectified positive, which may be particularly useful where the Universal Input Power Supply 12 needs to share a common neutral or ground with the input power source 16. Resistors R8, R9, R10, R11, and R13 help to stabilize the circuit.

The voltage across the Universal Power Supply 12 is thereby limited to either the rectified input voltage 504 or the threshold 120, shown here as about 330 volts, if the rectified voltage exceeds the threshold 120. The threshold 120 may be any voltage less than about 265 times the square root of 2 which is the peak voltage allowed into most Universal Power Supplies. The lower the threshold voltage 120 chosen for the circuit, the more power that will be dissipated in transistor Q3. Thus, a threshold voltage 120 of just less than the rating of the Universal Power Supply 12, such as 375 VDC, is preferred. Therefore, the threshold 120 is preferably above 300 volts and may be 330 VDC, 350 VDC, 365 VDC, or any voltage therebetween or between about 300 volts and about 375 volts.

It should be noted that while Q3 is running in linear mode, Q3 may dissipate substantial power. Thus, this embodiment may virtually anywhere between 70% and 90% efficient. For example, this embodiment's efficiency may be approximated by:

$$\text{Efficiency} = \frac{\text{Voltage across Universal Power supply 12}}{\text{Rectified Input Voltage}}$$

The Universal Input Power Supply's input power will be the same as its output power plus inefficiency of 10 to 30 percent. Fortunately, when transistor Q3 is running in linear mode, the output voltage across the Universal Input Power Supply 12 is at or near its maximum. The current into the Universal Input Power Supply 12 will be the input power divided by the input voltage, which is at its maximum, and the current is thus minimized. This minimized current flowing through Q3 minimizes the power dissipated by Q3.

For example, presume the Universal Input Power Supply 12 is supplying a 5 volt 3 amp load at 87% efficiency. Presume further that the threshold 120 is set to 330 volts and the input/received power 16 is at 500 VDC (353 Vrms upstream of the bridge rectifier 18). In this example, the Universal Input Power Supply 12 is providing 15 watts (5 volts times 3 amps). The Universal Input Power Supply 12 will thus require 17.24 watts (15 watts divided by 87%), with 52.25 milli-amps (17.24 watts divided by 330 volts). The switching element 24 (Q3) will experience 170 VDC (500 VDC-330 VDC) at the same 52.25 milli-amps. Thus, for at least a portion of the sine-wave, transistor Q3 will dissipate a maximum of 8.88 watts (170 VAC times 52.25 milli-amps). Of course, for the majority of the sine-wave, transistor Q3 will be operated in the fully saturated mode, and therefore dissipate less power. The closer the input/received power 16 stays to, or under, the threshold 120, the less voltage drop across transistor Q3 and the less power the switching element 24 will need to dissipate.

Figure 32:
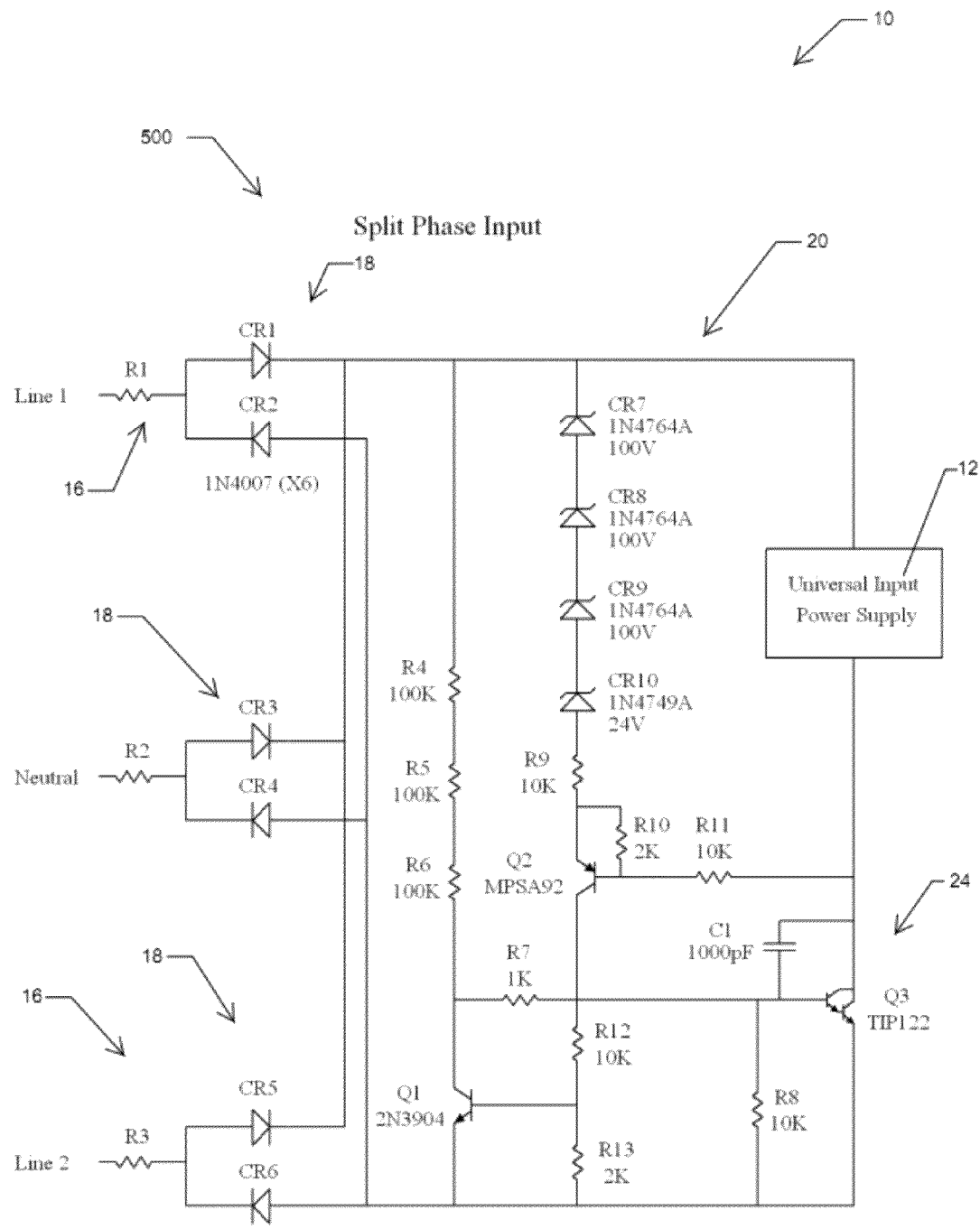
FIG. 32 illustrates another simplified circuit diagram of the fifth embodiment of the system of FIG. 28.
Figure 33:
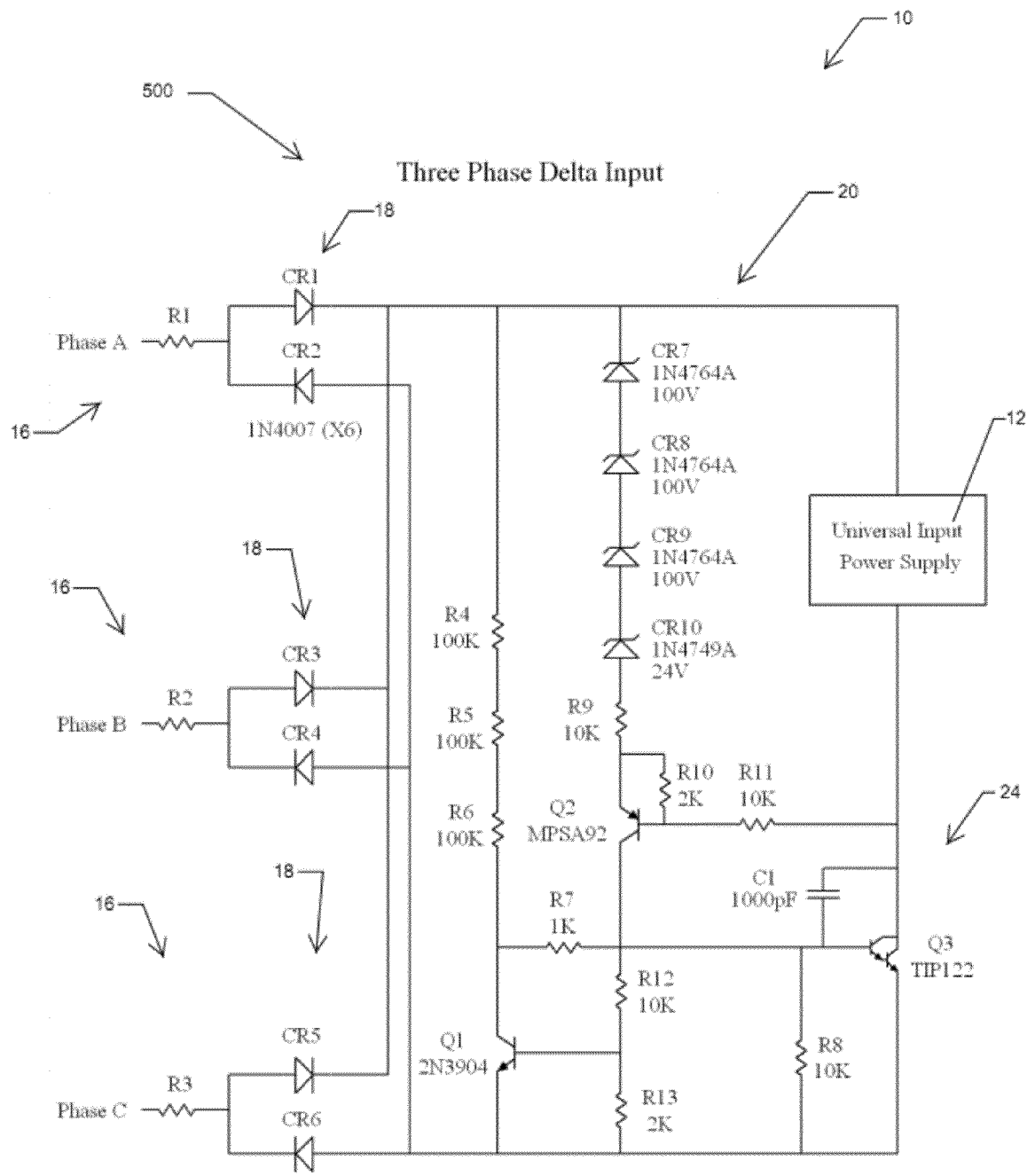
FIG. 33 illustrates a simplified circuit diagram of the fifth embodiment of the system of FIG. 28.
Figure 34:
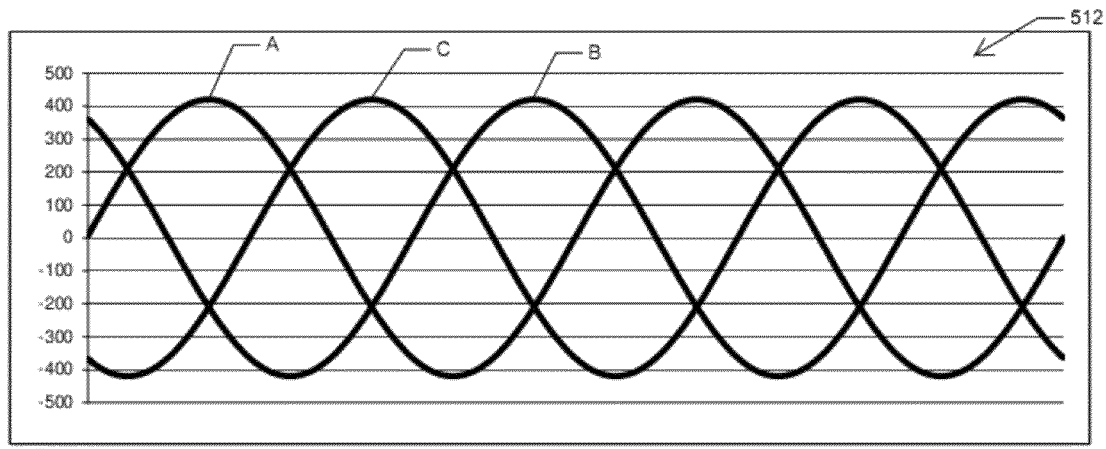
FIG. 34 illustrates a three-phase input voltage waveform, such as for use with the embodiment of FIG. 33.
Figure 35:
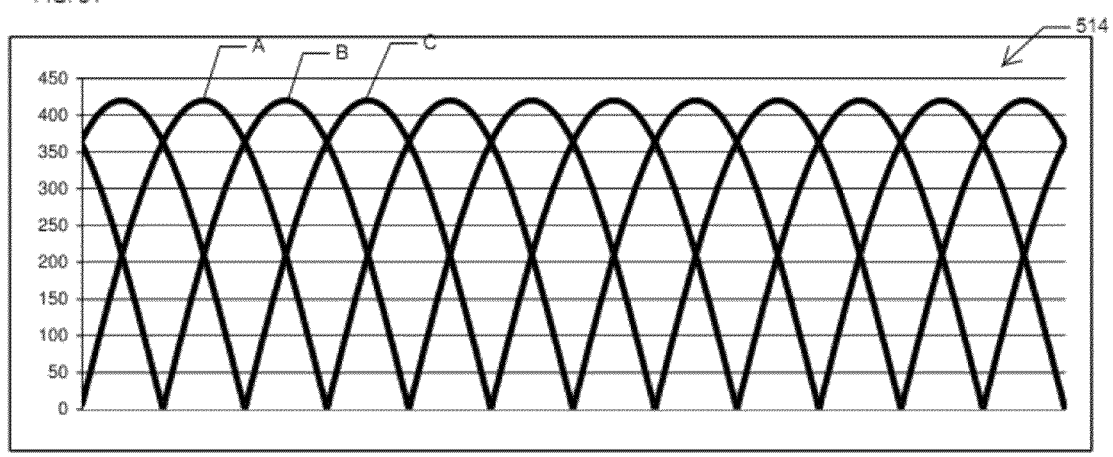
FIG. 35 illustrates a rectified three-phase input voltage waveform, such as for use with the embodiment of FIG. 33.
Figure 36:
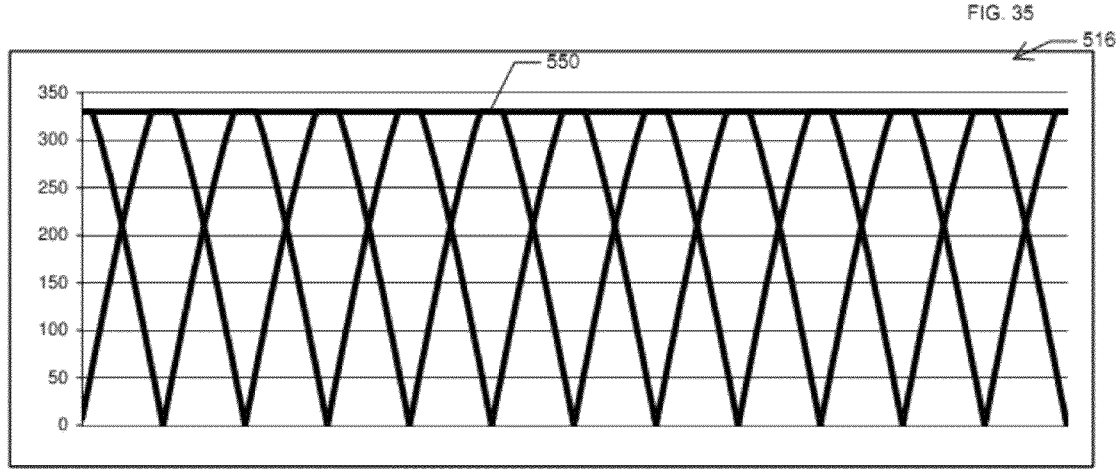
FIG. 36 illustrates a voltage limited three-phase output waveform, such as that produced by the embodiment of FIG. 33 utilizing certain aspects of the present inventions.
Figure 37:
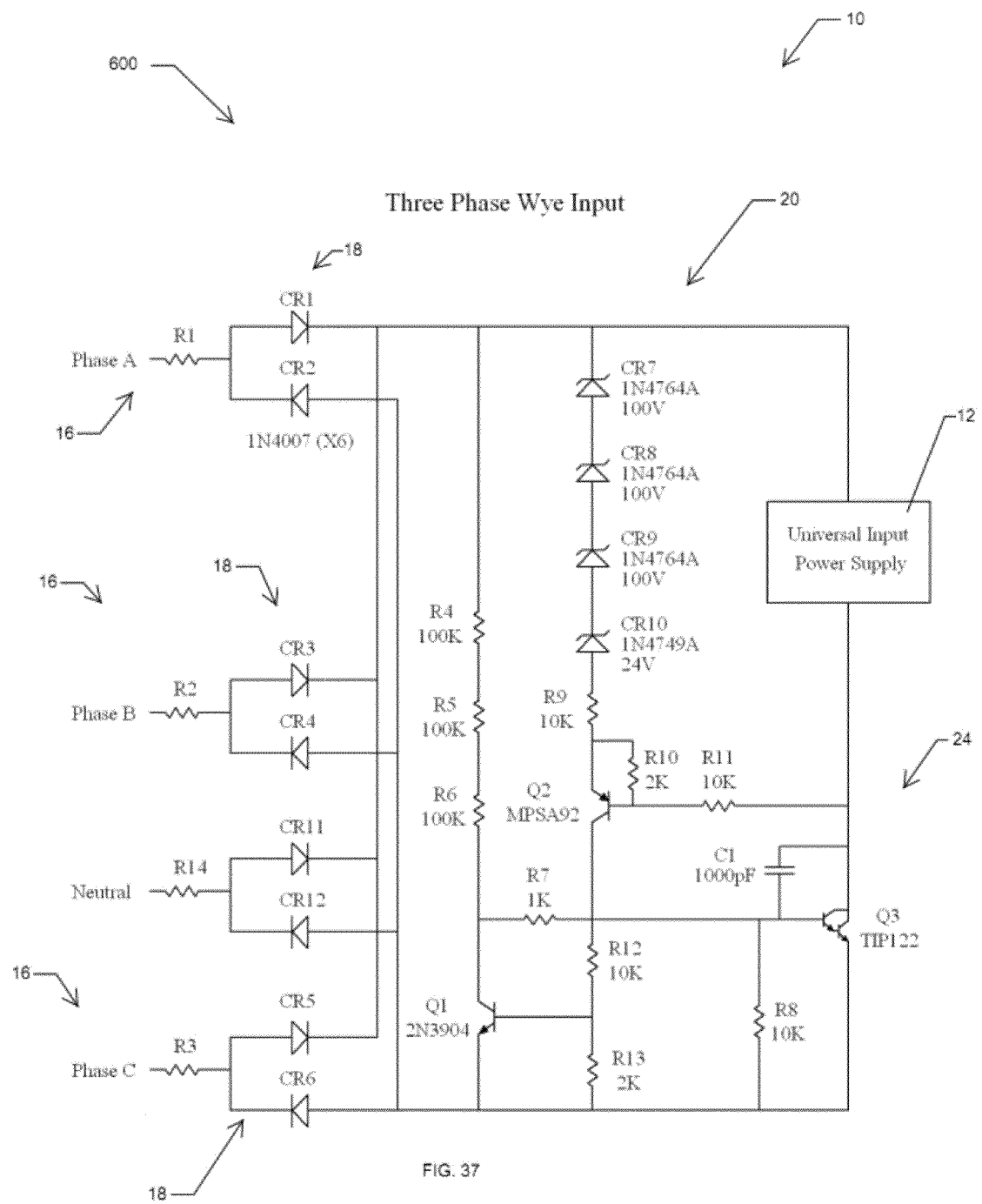
FIG. 37 illustrates a simplified circuit diagram of a sixth embodiment of a system utilizing certain aspects of the present inventions.

FIG. 32 shows how this embodiment 500 may be used with a split phase input power 16. FIG. 33 shows how this embodiment 500 may be used with a three phase input power 16. FIG. 34 shows an exemplary three phase input voltage 502, with phases A, B, C. FIG. 35 shows an exemplary rectified three phase input voltage 502, with phases A, B, C. FIG. 36 shows an exemplary voltage limited output 516 to the Universal Input Power Supply 12, which may include a smoothed output power, or voltage, 550 without requiring further conditioning. FIG. 37 shows how the above embodiment 500 may be modified into another embodiment 600 to used with a three phase WYE input power 16. Thus, the above embodiments may be used, or slightly modified for, a wide range of and drastically differing input power 16.

In this manner, each embodiment of the present invention may provide acceptable, safely usable output power from a wide range of received power, which may, for example, extend the useful voltage range of downstream equipment, such as the universal power supply. Of course, other and further embodiments utilizing one or more aspects of the inventions described above can be devised without departing from the spirit of Applicant's invention. For example, the present invention may also be used with other frequencies, such as 50 hertz, 400 hertz, or other frequencies. As discussed above, the system of the present may also receive AC, DC, or a combination thereof, and output AC, DC or a combination thereof, and may therefore include additional rectifiers and/or inverters and/or may not need the rectifier 18 discussed above. Additionally, while the above exemplary description has focused on reducing voltage, the embodiments of the present invention may be used to limit current and/or alter frequency of the received power. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of providing acceptable output power from a wide range of received power, the method comprising the steps of:
    outputting a received voltage as an output voltage if the received voltage does not exceed a threshold; and
    limiting the output voltage to the threshold if the received voltage exceeds the threshold;
    wherein limiting the output voltage comprises dropping an excess voltage across a switching element, wherein the excess voltage is the received voltage minus the threshold.

2. The method as set forth in claim 1, wherein the received voltage comprises multi-phase power and the output voltage remains acceptable during a phase loss in the received voltage.

3. The method as set forth in claim 1, further including rectifying the received voltage, such that the output voltage is a rectified version of the received voltage.

4. The method as set forth in claim 1, wherein the switching element is a transistor.

5. The method as set forth in claim 1, wherein a current of the output power flows though the switching element.

6. The method as set forth in claim 1, wherein the threshold is between about 330 volts and 375 volts.

7. The method as set forth in claim 1, wherein the threshold is above 300 volts.

8. The method as set forth in claim 1, further including the step of powering a universal input power supply with the output voltage.

9. A method of converting a received power to an output power, the method comprising the steps of:
    receiving an alternating current at a received voltage;
    rectifying the alternating current into a direct current;
    outputting the received voltage as an output voltage if the received voltage does not exceed a threshold; and
    limiting the output voltage to the threshold if the received voltage exceeds the threshold;
    wherein limiting the output voltage comprises dropping an excess voltage across a switching element, wherein the excess voltage is the received voltage minus the threshold.

10. The method as set forth in claim 9, wherein the received voltage comprises multi-phase power and the output voltage remains acceptable during a phase loss in the received voltage.

11. The method as set forth in claim 9, further including rectifying the received voltage, such that the output voltage is a rectified version of the received voltage.

12. The method as set forth in claim 9, wherein the switching element is a transistor.

13. The method as set forth in claim 9, wherein a current of the output power flows though the switching element.

14. The method as set forth in claim 9, wherein the threshold is between about 330 volts and 375 volts.

15. The method as set forth in claim 9, wherein the threshold is above 300 volts.

16. The method as set forth in claim 9, further including the step of powering a universal input power supply with the output voltage.

* * * * *